US012424125B2

(12) United States Patent
Cross et al.

(10) Patent No.: US 12,424,125 B2
(45) Date of Patent: Sep. 23, 2025

(54) MODULAR DISPLAY SYSTEM AND METHODS

(71) Applicant: Nanolumens Acquisition, Inc., Peachtree Corners, GA (US)

(72) Inventors: Robert James Cross, Alpharetta, GA (US); Rick Craig Cope, Duluth, GA (US); Jorge Perez-Bravo, Alpharetta, GA (US); Gary Feather, Norcross, GA (US); Drew Meincke, Woodstock, GA (US)

(73) Assignee: Nanolumens Acquisition, Inc., Peachtree Corners, GA (US)

( * ) Notice: Subject to any disclaimer, the term of this patent is extended or adjusted under 35 U.S.C. 154(b) by 0 days.

(21) Appl. No.: 18/238,823

(22) Filed: Aug. 28, 2023

(65) Prior Publication Data

US 2023/0410696 A1 Dec. 21, 2023

Related U.S. Application Data

(63) Continuation of application No. 17/019,520, filed on Sep. 14, 2020, now Pat. No. 11,741,859, which is a (Continued)

(51) Int. Cl.

| | |
|---|---|
| ***G09F 9/30*** | (2006.01) |
| ***A47F 3/00*** | (2006.01) |
| ***G09F 9/302*** | (2006.01) |
| ***G09F 13/00*** | (2006.01) |
| ***G09F 15/00*** | (2006.01) |

(52) U.S. Cl.

CPC ............ *G09F 9/3026* (2013.01); *A47F 3/001* (2013.01); *A47F 3/004* (2013.01); *G09F 13/00* (2013.01);

(Continued)

(58) Field of Classification Search

CPC .... G09F 9/3026; G09F 13/00; G09F 15/0068; A47F 3/001; A47F 3/004;

(Continued)

(56) References Cited

U.S. PATENT DOCUMENTS 6,813,853 B1 * 11/2004 Tucker ...................... G09F 9/33 345/82

8,096,068 B2 * 1/2012 Van Rens ............... G09F 9/301 40/515

(Continued)

*Primary Examiner* — Bayan Salone

(74) *Attorney, Agent, or Firm* — TROUTMAN PEPPER LOCKE LLP; James E. Schutz; Haden R. Marrs

(57) ABSTRACT

Disclosed are embodiments of display modules, assemblies of display modules, and systems of display modules. Display modules have a plurality of light emitting elements arranged in a predetermined pattern and providing a highly uniform visual effect. Alignment and complementary alignment features enable the alignment of adjacent display modules and the creation of large displays from a plurality of aligned display modules. Features to grip and retain a support frame are provided. Modules and systems have features that permit installation and removal from the front side of the display. A system of modular support frames works cooperatively with the display modules, adapting to different mounting environments, and thereby providing large modular displays with desirable properties.

13 Claims, 11 Drawing Sheets

Related U.S. Application Data continuation of application No. 16/710,763, filed on Dec. 11, 2019, now Pat. No. 10,777,104, which is a continuation of application No. 16/055,825, filed on Aug. 6, 2018, now Pat. No. 10,510,274, which is a continuation of application No. 15/142,870, filed on Apr. 29, 2016, now Pat. No. 10,043,422, which is a continuation of application No. 14/811,113, filed on Jul. 28, 2015, now Pat. No. 9,326,620.

(60) Provisional application No. 62/132,181, filed on Mar. 12, 2015.

(52) U.S. Cl.
CPC .. *G09F 15/0068* (2013.01); *A47B 2220/0077* (2013.01)

(58) Field of Classification Search
CPC .... A47B 2220/0077; F21S 2/00; F21S 2/005; F21Y 2105/001
See application file for complete search history.

(56) References Cited

U.S. PATENT DOCUMENTS

| | | | | |
|---|---|---|---|---|
| 8,104,204 | B1 * | 1/2012 | Syrstad | G09F 9/3026<br>40/544 |
| 8,780,039 | B2 * | 7/2014 | Gay | H04N 13/395<br>345/108 |
| 8,832,980 | B2 * | 9/2014 | Hill | G09F 7/18<br>40/606.12 |
| 9,176,535 | B2 * | 11/2015 | Bohn | G06F 1/1681 |
| 9,459,656 | B2 * | 10/2016 | Shai | G06F 1/1615 |
| 2009/0289160 | A1 * | 11/2009 | Kludt | G09F 9/33<br>248/226.11 |
| 2012/0236509 | A1 * | 9/2012 | Cope | F21V 21/096<br>361/730 |
| 2013/0076605 | A1 * | 3/2013 | Cope | G09G 3/36<br>345/55 |
| 2014/0003052 | A1 * | 1/2014 | Hemiller | H05K 7/14<br>362/249.02 |

* cited by examiner

MODULAR DISPLAY SYSTEM AND METHODS

CROSS REFERENCE TO RELATED APPLICATIONS

This application is a continuation of and claims the benefit of non-provisional utility application Ser. No. 17/019,520 filed Sep. 14, 2020, entitled "Modular Display System and Methods." application Ser. No. 17/019,520 is a continuation of and claims the benefit of non-provisional utility application Ser. No. 16/710,763, filed Dec. 11, 2019, entitled "Modular Display System and Methods". Application Ser. No. 16/710,763 is a continuation of and claims the benefit of non-provisional utility application Ser. No. 16/055,825, filed Aug. 6, 2018, entitled "Modular Display System and Methods". Application Ser. No. 16/055,825 is a continuation of and claims the benefit of non-provisional utility application Ser. No. 15/142,870, filed Apr. 29, 2016, entitled "Modular Display System and Methods". Application Ser. No. 15/142,870 is a continuation of and claims the benefit of application Ser. No. 14/811,113, filed Jul. 28, 2015, entitled "Modular Display System and Methods". Application Ser. No. 14/811,113 claimed the benefit of provisional Application No. 62/132,181, filed Mar. 12, 2015, entitled "Modular Display System and Methods". Application Ser. Nos. 16/710,763, 16/055,825, 15/142,870, 14/811,113 and 62/132,181 are incorporated herein by reference.

STATEMENT REGARDING FEDERALLY SPONSORED RESEARCH OR DEVELOPMENT

Not Applicable.

DESCRIPTION OF ATTACHED APPENDIX

Not Applicable.

BACKGROUND

The sense of sight is utterly compelling to those human beings who possess it. The adage that a picture is worth a thousand words resonates with an appreciation of the profound importance of taking in visual information. The sense of sight is unique in allowing us to absorb so much information from our world so quickly. It is natural then that advertisers, entertainers, artists, and others all want to engage people with their own visual content for the purpose creating a desired response in their intended audience. A large scale visual display system is a particularly compelling way for people to experience the presentation of visual information and such systems are the focus of the present disclosure.

There are numerous features of a visual display system that contribute to its impact upon viewers including: size, brightness, contrast, color saturation, color depth, display refresh rate, resolution, pixel pitch, pixel pitch uniformity, and others.

There are numerous other features of a visual display system that are of interest to the owners and operators of such systems including: ease of installation, ease of service, reliability, ease of configuration, ease of maintenance, ease of operation, cost of the system, cost of installation, cost of operation, cost of service, and others.

Display systems with large screen sizes present a number of difficult problems that are in need of solution. A typical mounting environment for a large display is on the outside structure of an existing building. Buildings are often situated so that the walls of the building are close to one or more real estate property boundaries. Installing a display system onto the outside of a building that is already constructed runs the risk of straying into the air rights of an adjacent real estate parcel because of the added thickness of the display system. If the display system is too thick the owner of the system may be forced to either remove the system or obtain the air rights in the adjacent real estate lot at added expense.

Another difficult problem in need of solution relates to the mounting of a large display on the outside of a building. The outer envelop of many buildings is constructed of brick, stone, concrete, and other materials that may be strong in compression, but weak in tension. The tension component of the structural load created by mounting a display system to the outside of a building is increased by both the thickness and the weight of the display system, especially when the system is mounted in a cantilevered configuration.

Yet another difficult problem in need of solution is that the outer envelop of most buildings is neither designed nor constructed to provide a smooth, even mounting surface, having no discontinuities. What is needed is a mounting system that is able to smooth out the unevenness of the underlying building structure so that the viewing plane of the large display shows no discontinuities and no unevenness.

In consideration of the foregoing points, it is clear that embodiments of the present disclosure confer numerous advantages and are therefore highly desirable.

SUMMARY

The present disclosure is directed to modular display systems, display modules, systems for mounting and servicing modular display systems, and methods for making, using, and servicing the modules and systems described.

Display systems of the present disclosure comprise a plurality of display modules assembled onto a support frame to make a large, unified, visual display. Each display module in the system comprises a plurality of light emitting elements coupled to a substrate and arranged in a predetermined pattern with respect to a display plane. Each display module is shaped so that it may abut one or more other display modules without introducing gaps or overlaps between adjacent display modules. The display systems disclosed create a highly uniform visual effect by creating highly uniform spacing between light emitting elements, both within a single display module and across a plurality of display modules when the plurality are assembled into a large, unified, visual display. The present disclosure provides complementary alignment features that cooperatively enforce alignment between adjacent display modules thereby maintaining highly uniform spacing of light emitting elements throughout the plurality of assembled display modules.

Additional features of the present disclosure address the needs of mounting, assembling, and servicing of large visual displays that are created from one or more display modules. One typical installation environment for a large display system is a rigid architectural structure like a wall or a curved wall that provides a mounting surface. Another typical installation environment may suspend a large display from a top mounted structure so that the display may appear to float. Other typical installation environments adapt the curvature of the viewing plane to convex, concave, and multiple curvature containing shapes that each have their own appeal and challenges. A system of modular support frames according to the present disclosure may be assembled thereby providing a substructure for attaching display modules to present a substantially flat viewing plane. In other embodiments of the current disclosure, a system of modular support frames may be assembled thereby providing a substructure for attaching display modules to present a non-flat viewing plane having convex, concave, or multiple convex and concave curvatures. One or more display modules may be individually mounted and unmounted from the system of support frames without substantially disturbing adjacent display modules.

Each display module provides a plurality of light emitting elements arranged on a display plane. After assembly, the plurality of display modules collectively create a viewing plane that may be viewed by the viewing public. In such an installation, the vast majority of the display system is located in the space between the viewing plane and the mounting surface. Installations of this configuration may be difficult, or impossible, to service or install from behind the viewing plane because the wall or curved wall that provides the mounting surface are rigid, contiguous structures that do not permit such access. The present disclosure provides support frame systems and display modules having cooperative mounting features allowing display modules to be installed and serviced from the viewing side of the viewing plane. In other installations, access to the front of the display may be difficult, or impossible, because of height hazards. The present disclosure provides frame systems and display modules having cooperative mounting features allowing display modules to be installed and serviced from the back side of the viewing plane.

To make the description more precise, it is useful to consider a three dimensional Cartesian coordinate system consisting of mutually orthogonal axes x, y, and z. The x-y plane is identified as being parallel to the viewing plane, and the z axis is in a direction perpendicular to the viewing plane. In this coordinate system it is the z axis that allows a viewer of the display to be in front of the viewing plane while the mounting surface and support frame are behind the viewing plane. The support frame system provides a means of securely and removeably coupling a plurality of display modules to a mounting surface while allowing the complementary alignment features of adjacent display modules to cooperatively create a uniform alignment of the plurality of light emitting elements on each of the plurality of display modules.

Features of the disclosure allow display modules to be installed, serviced, and removed from the front of the viewing plane. Features of the disclosure allow display modules to be installed, serviced, and removed from behind the viewing plane. A display module may have a frame grip that allows engagement onto a portion of the support frame while the orientation of the display module is tilted with respect to the viewing plane. The engagement of the frame grip with the support frame permits the display module to rotate about as the display plane of the display module is tilted both toward and away from the viewing plane. By rotating the display module one or more complementary pairs of alignment features on adjacent display modules can be operatively engaged. When complementary alignment features on adjacent display modules are operatively engaged, the display planes of adjacent display modules are aligned and may be made substantially co-planar. In some embodiments a frame retention means may be operated from the front of the display into a retaining position, thus securing the display module to the support frame while urging the one or more pairs of complementary alignment features to maintain a predetermined and uniform pitch distance between adjacent display modules. In other embodiments a frame retention means may be operated from the back of the display into a retaining position. The plurality of display modules installed onto the support frame collectively create a viewing plane having a highly uniform visual effect by maintaining a pitch distance between adjacent display modules that is substantially equal to the pitch distance within an individual display module.

Exemplary Concept 1.0 {Display module with alignment features}—According to a concept of the present disclosure, a display module, for use with an adjacent display module identical to said display module, comprises:

- a plurality of light emitting elements coupled to a substrate and disposed on a display plane in a predetermined pattern, said plurality of light emitting elements collectively creating a visual display upon said display plane;
- an x-axis lying in said display plane, said x-axis not parallel to a y-axis, said y-axis lying in said display plane;
- a first alignment feature rigidly coupled to said substrate and disposed in a predetermined relationship to said display plane;
- a first complementary alignment feature rigidly coupled to said substrate and disposed in a predetermined relationship to said first alignment feature.

Exemplary Concept 1.1—According to another concept of the present disclosure, exemplary concept 1.0 is further characterized in that when said first alignment feature operatively engages the first complementary alignment feature of said adjacent display module, said x-axis or said y-axis of said display plane is substantially aligned with the x-axis or the y-axis, respectively, of the display plane of said adjacent display module.

Exemplary Concept 1.2—According to another concept of the present disclosure, exemplary concept 1.0 is further characterized in that when said first alignment feature operatively engages the first complementary alignment feature of said adjacent display module, said display plane is substantially co-planar with the display plane of said adjacent display module.

Exemplary Concept 1.3—According to another concept of the present disclosure, exemplary concept 1.0 in which said predetermined pattern is further characterized in that each of said plurality of light emitting elements is disposed about a first pitch distance away from at least two closest adjacent light emitting elements, said pitch distance being substantially uniform across said predetermined pattern.

Exemplary Concept 1.4—According to another concept of the present disclosure, exemplary concept 1.3 in which said predetermined pattern is further characterized in that when said first alignment feature operatively engages the first complementary alignment feature of said adjacent display module: said display plane is substantially co-planar with the display plane of said adjacent display module.

Exemplary Concept 1.5—According to another concept of the present disclosure, exemplary concept 1.3 in which said predetermined pattern is further characterized in that when said first alignment feature operatively engages the first complementary alignment feature of said adjacent display module:

- said display plane is co-planar with and abuts the display plane of said adjacent display module, a second pitch distance being created between adjacent light emitting elements between said display module and said adjacent display module, wherein said first pitch distance and said second pitch distance are substantially equal.

Exemplary Concept 1.6—According to another concept of the present disclosure, exemplary concept 1.3 is further characterized in that when said first alignment feature operatively engages the first complementary alignment feature of said adjacent display module:

said predetermined pattern of said display module is and substantially aligned with the predetermined pattern of said adjacent display module; and, no perceivable visual aberration is created between said predetermined pattern of said display module and the predetermined pattern of said adjacent display module.

Exemplary Concept 1.7—According to another concept of the present disclosure, exemplary concepts 1.0—1.6 are further characterized in that when said first alignment feature of said display module operatively engages the first complementary alignment feature of said adjacent module, a constraint force is created that urges said first alignment feature of said display module to stay operatively engaged to the first complementary alignment feature of said adjacent display module.

Exemplary Concept 2.0—According to another concept of the present disclosure, exemplary concept 1.0 further comprising:

a second alignment feature rigidly coupled to said substrate and disposed in a predetermined relationship to said display plane; and, a second complementary alignment feature rigidly coupled to said substrate and disposed in a predetermined relationship to said first alignment feature.

Exemplary Concept 2.1—According to another concept of the present disclosure, exemplary concept 2.0 further characterized in that when said first alignment feature operatively engages the first complementary alignment feature of said adjacent display module, and said second alignment feature operatively engages the second complementary alignment feature of said adjacent display module, said x-axis or said y-axis of said display plane is substantially aligned with the x-axis or the y-axis, respectively, of the display plane of said adjacent display module and said display plane is substantially co-planar with the display plane of said adjacent display module.

Exemplary Concept 2.2—According to another concept of the present disclosure, exemplary concept 2.0 further characterized in that when said first alignment feature operatively engages the first complementary alignment feature of said adjacent display module and said second alignment feature operatively engages the second complementary alignment feature of said adjacent display module, said display plane is substantially co-planar with the display plane of said adjacent display module.

Exemplary Concept 2.3—According to another concept of the present disclosure, exemplary concept 2.0 in which said predetermined pattern is further characterized in that each of said plurality of light emitting elements is disposed about a first pitch distance away from at least two closest adjacent light emitting elements, said pitch distance being substantially uniform across said predetermined pattern.

Exemplary Concept 2.4—According to another concept of the present disclosure, exemplary concept 2.3 in which said predetermined pattern is further characterized in that when said first alignment feature operatively engages the first complementary alignment feature of said adjacent display module:

said display plane abuts the display plane of said adjacent display module, a second pitch distance being created between adjacent light emitting elements between said display module and said adjacent display module, wherein said first pitch distance and said second pitch distance are substantially equal.

Exemplary Concept 3.0—According to another concept of the present disclosure, exemplary concept 2.0 further comprising:

a third alignment feature rigidly coupled to said substrate and disposed in a predetermined relationship to said display plane; and, a third complementary alignment feature rigidly coupled to said substrate and disposed in a predetermined relationship to said first alignment feature.

Exemplary Concept 3.5 {Super nixel with alignment features}—A display assembly for use with an identical adjacent display assembly, comprises:

a first display module comprising:

a plurality of light emitting elements coupled to a substrate and disposed on a display plane in a predetermined pattern, said plurality of light emitting elements collectively creating a visual display upon said display plane;

an x-axis lying in said display plane, said x-axis not parallel to a y-axis, said y-axis lying in said display plane;

a first alignment feature rigidly coupled to said substrate and disposed in a predetermined relationship to said display plane;

a first complementary alignment feature rigidly coupled to said substrate and disposed in a predetermined relationship to said first alignment feature;

a second display module identical to said first display module and disposed with respect to said first display module such that the display plane of said second display module abuts said display plane of said first display module, and the x-axis or the y-axis of the display plane of said second display module is substantially aligned to said x-axis or said y-axis, respectively, of said display plane of said first display module;

a semi-rigid front mask coupled to both said first display module and said second display module, said front mask being substantially co-planar with and covering the display planes of both said first display module and said second display module.

Exemplary Concept 3.6—According to another concept of the present disclosure, exemplary concept 3.5 in which the predetermined pattern of both first display module and second display module is further characterized in that each of said plurality of light emitting elements is disposed about a first pitch distance away from at least two closest adjacent light emitting elements, said pitch distance being substantially uniform across said predetermined pattern.

Exemplary Concept 3.7—According to another concept of the present disclosure, exemplary concept 3.6 further characterized in that when said first alignment feature operatively engages the first complementary alignment feature of said adjacent display assembly:

said front mask abuts the front mask of said adjacent display assembly, a second pitch distance being created between adjacent light emitting elements between said display assembly and said adjacent display assembly, wherein said first pitch distance and said second pitch distance are substantially equal.

Exemplary Concept 4.0—{Display system} A modular display system for creating a visual display upon a viewing plane according to the present disclosure comprises:

a support frame having one or more apertures;

a first display module comprising:

a plurality of light emitting elements coupled to a substrate and disposed on a display plane in a predetermined pattern, said plurality of light emitting elements collectively creating a visual display upon said display plane;

a frame grip rigidly coupled to said substrate and disposed upon said substrate opposite to said display plane, said frame grip operative to engage a portion of said support frame and allow said display module to move between a service position and an installed position; said service position characterized in that said display plane is tilted with respect to said viewing plane; said installed position characterized in that said display plane is substantially co-planar with said viewing plane;

a releasable frame retention means attached to said substrate and having a retaining position and a non-retaining position, said retaining position effective for engaging a portion of said support frame and urging said display plane to be substantially co-planar with said viewing plane, said non-retaining position allowing said display plane to tilt with respect to said viewing plane, said releasable frame retention means disposed to be actuated between said retaining position and said non-retaining position from the display plane side of said display module.

Exemplary Concept 5.0—A modular display system for creating a visual display upon a viewing plane according to exemplary concept 4.0 additionally comprising:

the first display module additionally comprising:

an alignment feature rigidly coupled to said substrate and disposed in a predetermined relationship to said display plane;

a complementary alignment feature rigidly coupled to said substrate and disposed in a predetermined relationship to said alignment feature;

a second display module identical to said first display module, said second display module in the installed position and its releasable frame retention means in the coupled position;

said modular display system further characterized in that:

when said first display module is in the installed position, the alignment feature of the first display module operatively engages the complementary alignment feature of said second display module causing the display planes of the first and second display modules to be substantially co-planar; and, when the first display module is moved from the installed position to the service position, the alignment feature of the first display module operatively disengages from the complementary alignment feature of said second display module as the orientation of the display plane of said first display module becomes tilted with respect to the viewing plane.

Exemplary Concept 6.0—A modular display system for creating a visual display upon a viewing plane according to exemplary concept 5.0 additionally comprising:

a third display module identical to said first display module, said third display module in the installed position and its releasable frame retention means in the coupled position;

said modular display system further characterized in that:

when the first display module is in the installed position, the complementary alignment feature of the first display module operatively engages the alignment feature of said third display module causing the display planes of the first and third display modules to be substantially coplanar;

when the first display module is moved from the installed position to the service position, the complementary alignment feature of the first display module operatively disengages from the alignment feature of said third display module as the orientation of the display plane of said first display module becomes tilted with respect to the viewing plane.

Exemplary Concept 7.0—A modular display system for creating a visual display upon a viewing plane according to exemplary concept 4.0 additionally comprising:

the first display module additionally comprising:

a first alignment feature rigidly coupled to said substrate and disposed in a predetermined relationship to said display plane;

a first complementary alignment feature rigidly coupled to said substrate and disposed in a predetermined relationship to said alignment feature;

a second alignment feature rigidly coupled to said substrate and disposed in a predetermined relationship to said display plane;

a second complementary alignment feature rigidly coupled to said substrate and disposed in a predetermined relationship to said alignment feature;

a second display module identical to said first display module, said second display module in the installed position and its releasable frame retention means in the coupled position;

a third display module identical to said first display module, said third display module in the installed position and its releasable frame retention means in the coupled position;

said modular display system further characterized in that:

when said first display module is in the installed position, the first alignment feature of the first display module operatively engages the first complementary alignment feature of said second display module causing the display planes of the first and second display modules to be substantially co-planar;

when said first display module is in the installed position, the second alignment feature of the first display module operatively engages the second complementary alignment feature of said third display module causing the display planes of the first and third display modules to be substantially co-planar; and, when the first display module is moved from the installed position to the service position, the first alignment feature of the first display module operatively disengages from the first complementary alignment feature of said second display module as the orientation of the display plane of said first display module becomes tilted with respect to the viewing plane; and, when the first display module is moved from the installed position to the service position, the second alignment feature of the first display module operatively disengages from the second complementary alignment feature of said third display module as the orientation of the display plane of said first display module becomes tilted with respect to the viewing plane Exemplary Concept 7.1—the modular display system for creating a visual display upon a viewing plane according to exemplary concept 7.0 further characterized in that:

when first display module is in the installed position first display module y-axis is aligned with second display module y-axis and first display module x-axis is aligned with third display module x-axis, and the display planes of first, second, and third display modules are all substantially co-planar.

Exemplary Concept 8.0—{Modular support frame} A modular system for supporting a plurality of display modules tiled to collectively form a viewing plane, the system comprising: a support frame and an adjacent support frame identical to said support frame, each support frame comprising:

a thin planar support body configured to support the weight of said plurality of display modules along a support direction, said support body having:

a display mounting face having one or more apertures and configured to receive at least a portion of said plurality of display modules;

one or more support ribs attached to said planar support body opposite to said display mounting face and substantially aligned with said support direction;

a first mating face disposed contiguous to at least a portion of a first edge of said display mounting face, said first mating face being substantially perpendicular to said display mounting face where said first mating face and said display mounting face meet;

said first mating face having a first alignment feature disposed in a predetermined relationship to said display mounting face;

a second mating face disposed contiguous to at least a portion of a second edge of said display mounting face, said second mating face being substantially perpendicular to said display mounting face where said second mating face and said display mounting face meet;

said second mating face having a first complementary alignment feature disposed in a predetermined relationship to said first alignment feature; and, said modular system further characterized in that operative engagement of said first alignment feature with the first complementary alignment feature of said adjacent support frame causes said display mounting face of said support frame to be substantially co-planar with the display mounting face of said adjacent support frame.

Exemplary Concept 8.0a—the modular system according to exemplary concept 8.0 characterized in that the first mating face is a surface portion of one of the said one or more support ribs, and further characterized in that the second mating face is a surface portion of one of the said one or more support ribs.

Exemplary Concept 8.1—the modular system according to exemplary concept 8.0 additionally comprising a second adjacent support frame identical to said support frame and in which each support frame additionally comprises:

a third mating face disposed contiguous to at least a portion of a third edge of said display mounting face, said third mating face being substantially perpendicular to said display mounting face where said third mating face and said display mounting face meet;

said third mating face having a second alignment feature disposed in a predetermined relationship to said display mounting face;

a fourth mating face disposed contiguous to at least a portion of a fourth edge of said display mounting face, said fourth mating face being substantially perpendicular to said display mounting face where said fourth mating face and said display mounting face meet;

said fourth mating face having a second complementary alignment feature disposed in a predetermined relationship to said second alignment feature; and, said modular system further characterized in that operative engagement of said second alignment feature with the second complementary alignment feature of said second adjacent support frame causes said display mounting face of said support frame to be substantially co-planar with the display mounting face of said adjacent support frame.

Exemplary Concept 8.2—the modular system according to exemplary concept 8.0 additionally comprising: an equipment mount attached to one of said one or more support ribs, said equipment mount operative to transfer a load applied to said equipment mount into said support frame through the rib to which said pedestal is attached.

Exemplary Concept 8.3—the modular system according to exemplary concept 8.0a additionally comprising: a first frame mount attached to the support rib of the said one or more support ribs that is closest to said first mating surface; and a second frame mount attached to the support rib of the said one or more support ribs that is closest to said second mating surface.

Exemplary Concept 8.5a—the modular system according to exemplary concept 8.0 additionally comprising: a tension member coupled to said planar support body and configured to provide curvature of at least a portion of said planar support body transverse to said support direction.

Exemplary Concept 8.5b—the modular system according to exemplary concept 8.5a in which the tension member is coupled to said support body on the same side as the said one or more support ribs, and in which said display mounting face is convexly curved.

Exemplary Concept 8.6a—the modular system according to exemplary concept 8.0 additionally comprising: a compression member coupled to said planar support body and configured to provide curvature of at least a portion of said planar support body transverse to said support direction.

Exemplary Concept 8.6b—the modular system according to exemplary concept 8.6a in which the compression member is coupled to said support body on the same side as the said one or more support ribs, and in which said display mounting face is concavely curved.

BRIEF DESCRIPTION OF THE DRAWINGS

These and other features, aspects, and advantages of the present invention will become better understood with regard to the following description, appended claims, and accompanying drawings where:

LIST OF REFERENCE NUMBERS APPEARING IN THE FIGURES

Figure 1A:
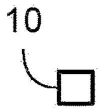
FIG. 1A shows a square consistent with a regular four sided polygon.

8—coordinate system showing x-axis, y-axis, and z-axis
8X—x-axis
8Y—y-axis
8Z—z-axis
10—square tile, which is a regular 4 sided polygon
10*a*, 10*b*, etc. —first square, second square, etc.
11—pitch distance
12—square tiling of the plane
12*v*—representative vertex of the square tiling
12*s*—representative side of the square tiling
14—predetermined pattern corresponding to a tiling of the plane
30—tension member
32—compression member
40—semi-rigid support frame
41—support direction
42—support frame aperture
42*a*, 42*b*, etc. —first, second, etc. support frame aperture
44—thin planar support body
46—display mounting face
46*a*, 46*b*, 46*c*, etc. —first, second, third, etc. display mounting face
46*e*—edge of display mounting face
46*e*1, 46*e*2, 46*e*3, 46*e*4—first, second, third, fourth edge of display mounting face
48—support rib
50—mating face
50*a*, 50*b*, 50*c*, 50*d*—first, second, third, fourth mating face
52—alignment feature of a mating face
54—complementary alignment feature of a mating face
58—equipment mount
60—frame mounting feature
62—vertical frame mounting feature
70—display module
70*a*, 70*b*, 70*c* etc. —first, second, third, etc. display module
71—light emitting element
71*a*, 71*b*, etc. —first, second, etc. light emitting element
72—plurality of light emitting elements
74—display plane
75—display plane disposed at a first angle with respect to the viewing plane
76—display module substrate
78—display assembly
78*a*, 78*b*, 78*c*, etc. —first, second, third, etc. display assembly
80—viewing plane

84—semi rigid front mask
90—frame grip
91—frame grip service position
93—frame grip installed position
100—alignment feature
100*a*, 100*b*, 100*c*, etc. —first, second, third, etc. alignment feature
110—complementary alignment feature
110*a*, 110*b*, 110*c*, etc. —first, second, third, etc. complementary alignment feature
120—frame retention means
121—frame retention means in a non-retaining position
123—frame retention means in a retaining position

DESCRIPTION

Tesselation of a planar surface is the tiling of the plane using one or more geometric shapes, called tiles, creating no gaps and no overlaps. A periodic tiling has a repeated geometric pattern. A regular tiling is a tiling in which all tiles are regular polygons having the same size and shape. Square, triangular, and hexagonal tilings are each an example of a regular, periodic tiling that can achieve a tesselation of a planar surface without gaps or overlaps. Tilings are of special interest in the construction of modular displays because their properties enable the construction of large displays with desirable properties. Assembling a plurality of smaller display modules in which each display module is configured to have a size, shape, and orientation corresponding to a predetermined tiling may produce a large display having no gaps and no overlaps between adjacent display modules.

Within a single display module, a plurality of light emitting elements may be arranged in a predetermined pattern derived from an appropriately configured tiling. A planar tiling of regular polygons consists of edges and vertexes. The set of vertexes of a regular polygon tiling can be seen to create a pattern with a high degree of regularity. A highly uniform visual effect may be produced by placing a light emitting element at or about each of the vertexes of a regular polygon tiling.

In creating a uniform visual effect, it is useful to consider a property called pitch distance, which is the distance between any light emitting element and its closest adjacent light emitting elements. It can be seen that a highly uniform visual effect is produced by maintaining a highly uniform pitch throughout a single display module and across a plurality of adjacent display modules. Preferred embodiments of the present disclosure use light emitting elements located at or about the vertexes of a regular polygon tiling. A regular square tiling is one such preferred tiling, producing a uniform visual effect by providing uniform spacing between both rows and columns of light emitting elements. The spacing between adjacent rows and between adjacent columns of a regular square tiling may be referred to as the pitch of that pattern. In such a square tiling, it can be seen that any light emitting element will have at least two closest adjacent neighboring elements that are spaced apart from each other by a distance close to or substantially equal to the pitch distance.

In addition to uniform pitch within a single display module, the spacing between display modules can be controlled so that uniform pitch of light emitting elements is maintained across a plurality of assembled display modules. A preferred embodiment is to provide a display module with a perimeter region, of a predetermined width, that contains no light emitting elements. The preferred width of the perimeter region is less than or about equal to one half of the pitch distance, when measured inward and along the edges of the regular polygon tiling defining the location of the plurality of the light emitting elements. When two display modules are assembled adjacent to one another, each module may provide a perimeter region width of about one half of the pitch, which cumulatively creates a pattern of uniform pitch spanning both modules. A plurality of display modules may thereby be assembled to create uniform pitch spanning the plurality of display modules.

A single display module may comprise a plurality of light emitting elements coupled to a substrate, and arranged in a predetermined pattern corresponding to the vertexes of a regular polygon tiling. The display module has a perimeter. A plurality of display modules may be assembled such that a portion of the perimeter of each display module abuts a portion of the perimeter of at least one other display module, each module positioned to maintain uniform pitch spacing across the plurality of display modules.

A display system according to the present disclosure may be constructed by assembling a plurality of display modules onto a support frame, the support frame having been previously.

Figure 1B:
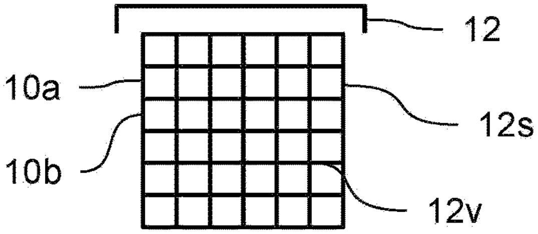
FIG. 1B shows a square tiling of a two dimensional plane

Turning now to FIG. 1A, shown is a regular four sided polygon, also called a square 10, consistent with the square tiling 12 of the two dimensional plane shown in FIG. 1B. A coordinate system 8 is indicated so as to make discussion of geometry features of the present disclosure more clear. Square tiling 12 is comprised of a plurality of square tiles, of which first square 10*a* and second squarelOb are typical, arranged so that no gaps and no overlaps are produced. When arranged into the predetermined pattern shown in FIG. 1B, the square tiling 12 can be seen to create a plurality of vertex 12*v* and a plurality of side 12*s*, in which every vertex 12*v* is separated a distance of about 12*s* from each of its closest neighboring vertexes.

Figure 1C:
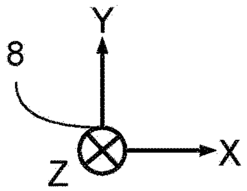
FIG. 1C shows coordinate axis defined on square tiling. Enlarged view 1D is indicated
Figure 1C:
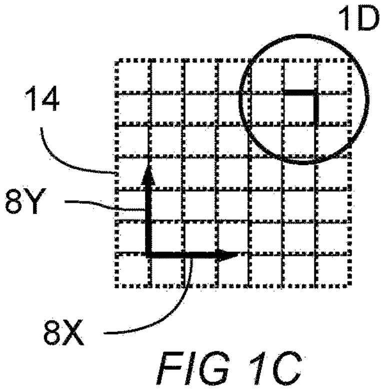
Figure 1D:
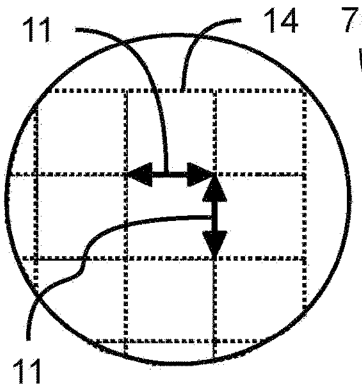
FIG. 1D shows an enlarged view of the indicated region of FIG. 1C showing uniform row and column pitch distance.

FIG. 1C shows predetermined pattern corresponding to a tiling of the plane 14 according to a square tiling. Overlaid onto the predetermined pattern corresponding to a tiling of the plane 14 are x-axis 8X and y-axis 8Y, showing that a coordinate system can be overlaid onto the predetermined pattern to facilitate clear disclosure of the location and alignment of other features to be described. The enlarged section, denoted FIG. 1D, shows that the square tiliing of the plane gives rise to a highly uniform spacing of vertexes, which can be characterized as pitch distance 11. Pitch distance 11 corresponding to the predetermined pattern 14 gives rise to uniform spacing between rows and columns when that predetermined pattern is based upon a square tiling. It can be seen that row spacing and column spacing are both about equal to the pitch distance 11.

Figure 1E:
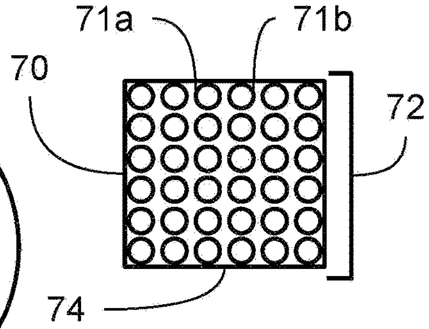
FIG. 1E shows a plan view of a display module having a plurality of light emitting elements coordinate axis defined on square tiling.
Figure 1F:
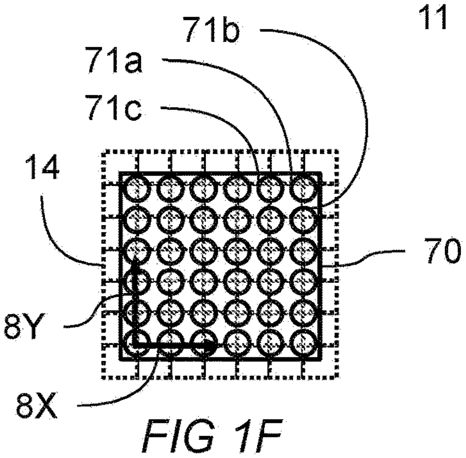
FIG. 1F shows the display module of FIG. 1E overlaid with the predetermined pattern of square tiling and coordinate axes.

Turning now to FIG. 1E, shown is a display module 70 having a plurality of light emitting elements 72, of which first light emitting element 71*a* and second light emitting element 71*b* are individual members of the plurality. Plurality of light emitting elements 72 is shown arranged according to a predetermined pattern so as to create a highly uniform visual effect upon display plane 74. FIG. 1F shows how predetermined pattern 14 according to a square tiling of the plane may be used to position individual light emitting elements 71*a*, 71*b*, and 71*c* according to the location of the vertexes of said predetermined pattern 14. Superimposed upon the plurality of light emitting elements are x-axis 8X and y-axis 8Y. The display module 70 of FIG. 1F comprises a plurality of light emitting elements, each of which may be a single light emitting device or multiple light emitting devices. A preferred light emitting element combines red, blue, and green light emitting devices within one light emitting element so as to provide full color spectrum display. Monochrome and other combinations of devices may be used still within the spirit and scope of this disclosure. The display modules of FIG. 1E and FIG. 1F each have a region adjacent to their perimeter that is free from light emitting elements. This enables close spacing of adjacent modules as will be seen now.

Figure 1G:
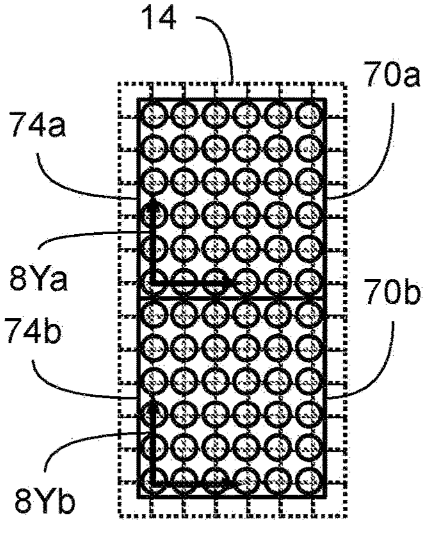
FIG. 1G shows a plan view of two display modules aligned along their y-axis.

FIG. 1G shows a first display module 70*a* adjacent to a second display module 70*b* and disposed so that their display planes 74*a* and 74*b* abut and their respective y-axes 8Ya and 8Yb are substantially aligned, thereby creating a highly uniform visual effect that spans the combined display modules. A pitch distance can be defined between adjacent light emitting elements between adjacent display modules that is substantially equal to the pitch distance between adjacent light emitting elements within a single display module.

Figure 1H:
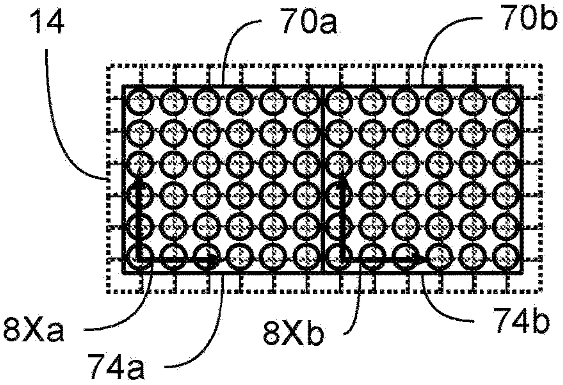
FIG. 1H shows a plan view of two display modules aligned along their x-axis.

FIG. 1H shows a first display module 70*a* adjacent to a second display module 70*b* and disposed so that their respective display planes 74*a* and 74*b* abut and their respective x-axes 8Xa and 8Xb are substantially aligned, thereby creating a highly uniform visual effect that spans the combined display modules. A pitch distance can be defined between adjacent light emitting elements between adjacent display modules that is substantially equal to the pitch distance between adjacent light emitting elements within a single display module. When abutted and aligned in the foregoing manner, two adjacent modules may be combined such that their combined plurality of light emitting elements are disposed upon a single predetermined pattern 14 defining a regular tiling of the plane.

FIG. 1G and FIG. 1H make it clear that a large display may be constructed from display modules designed according to the teaching of FIG. 1A-FIG. 1H. Such a large display will tile the two dimensional plane without gaps and without overlaps and produce a highly uniform visual effect. Any number of display modules may be combined in both x and y directions to make a large display that is substantially free from visual aberrations.

Figure 2A:
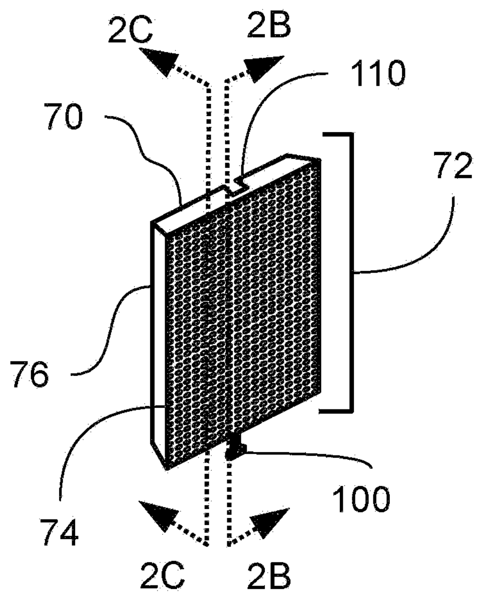
FIG. 2A shows a perspective view of a display module. Cross sections 2B and 2C are indicated.

FIG. 2A shows a perspective view of a display module 70 having a plurality of light emitting elements 72 coupled to a substrate 76 and disposed in a predetermined pattern to create a display plane 74. Also coupled to substrate 76 are alignment feature 100 and complementary alignment feature 110, which are both designed to operatively engage features on adjacent display modules so as to cooperatively establish and maintain alignment and registration with adjacent display modules, thereby creating a highly uniform visual effect. Alignment feature 100 is designed so that it may operatively engage a complementary alignment feature on an adjacent display module and thereby constrain the relative position of the two adjacent display modules. Likewise, Complementary alignment feature 110 is designed so that it may operatively engage an alignment feature on an adjacent display module and thereby constrain the relative position of the two adjacent display modules. An x-axis may be defined to lie in the display plane. A y-axis, non-parallel to said x-axis, may also be defined to lie in the display plane. Engagement of an alignment feature with a complementary alignment feature on an adjacent module may create: substantial alignment of the x-axes of the display planes of the adjacent modules, substantial alignment of the y-axes of the display planes of the adjacent modules, substantial alignment of both x-axes and y-axes of the two modules, substantial co-planarity of the display planes of the adjacent modules, substantial alignment of either x-axes or y-axes along with the substantial co-planarity of the display planes of the adjacent modules. Substantial alignment in the foregoing description means alignment sufficient to avoid perceivable visual aberration between adjacent display modules. Substantial co-planarity in the foregoing description means alignment sufficient to avoid perceivable visual aberration between adjacent display modules.

Figure 2B:
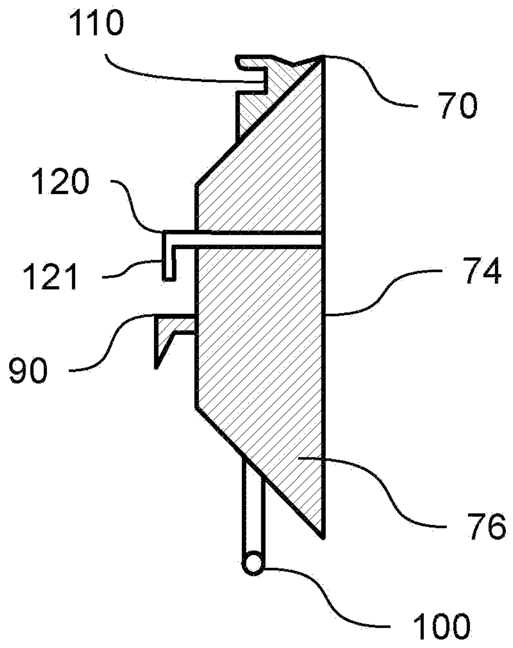
FIG. 2B shows a cross sectional schematic view of the display module of FIG. 2A.

Shown now in FIG. 2B is a cross sectional view as indicated from FIG. 2A. The cross sectional view shows additional features of display module 70 not visible in FIG. 2A due to its orientation. Display module 70 additionally comprises: a frame grip 90 coupled to substrate 76 and adapted to engage with a support frame, not shown in this figure; and a frame retention means 120, shown here in a non-retaining position 121. Frame retention means is operative to move between said non-retaining position 121 and a retaining position for securing the display module to a support frame, further characterized in that frame retention means 120 may be actuated by a person from the display plane side of the display module. In preferred embodiments the frame retention means may be actuated by means of a turning motion, from the front of the display plane, and thereby progressively engage a clamping force between the support frame and display module 70. The clamping force may be provided by a spring member that securely, but not rigidly, attaches the display module to the support frame. Also shown in FIG. 2B are alignment feature 100 and complementary alignment feature 110 which are operative for engaging alignment features of adjacent display modules. In preferred embodiments adjacent display modules may be identical to display module 70.

Figure 2C:
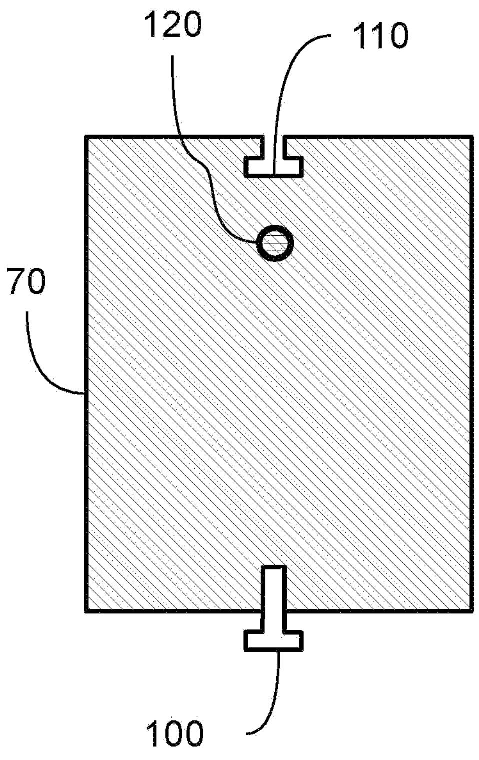
FIG. 2C shows another cross sectional schematic view of the display module of FIG. 2A.

Shown in FIG. 2C is a cross sectional view as indicated from FIG. 2A. In this figure the complementary mechanical design of alignment feature 100 and complementary alignment feature 110 can be seen. Also shown is a circular cross section of frame retention means 120, which facilitates actuation of frame retention means 120 by means of rotation. The single pair of alignment features is collectively sufficient to constrain the position and alignment of two adjacent display modules of compatible or identical design.

Figure 2D:
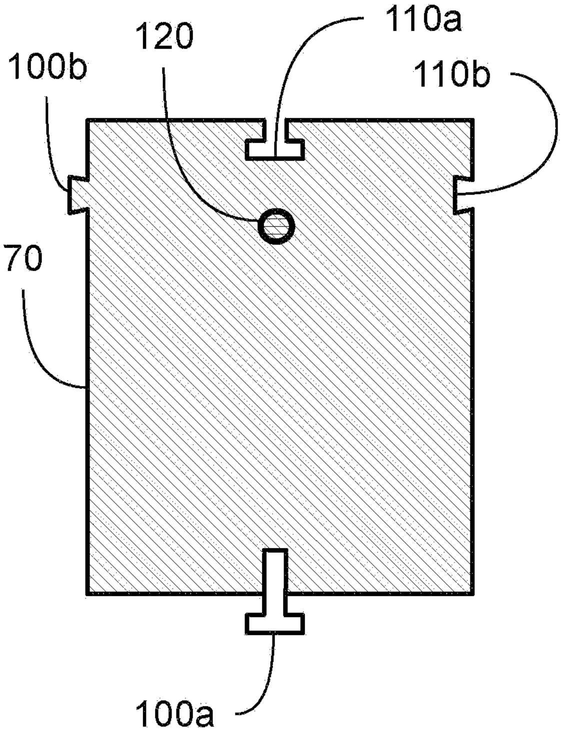
FIG. 2D shows a cross sectional schematic view of another embodiment of a display module having two pairs of complementary alignment features.

Shown in FIG. 2D shows a cross sectional view similar to FIG. 2C, but of another embodiment of the present disclosure in which display module 70 comprises two pairs of alignment features: first alignment feature 100*a* and first complementary alignment feature 110*a*; and second alignment feature 100*b* and second complementary alignment feature 110*b*. In this embodiment 100*a* and 110*a* have a complementary mechanical design, and 100*b* and 110*b* have a complementary mechanical design. The two pairs of alignment features are collectively sufficient to constrain the position and alignment of four adjacent display modules of compatible or identical design.

Figures 3A, 3B, 3C:
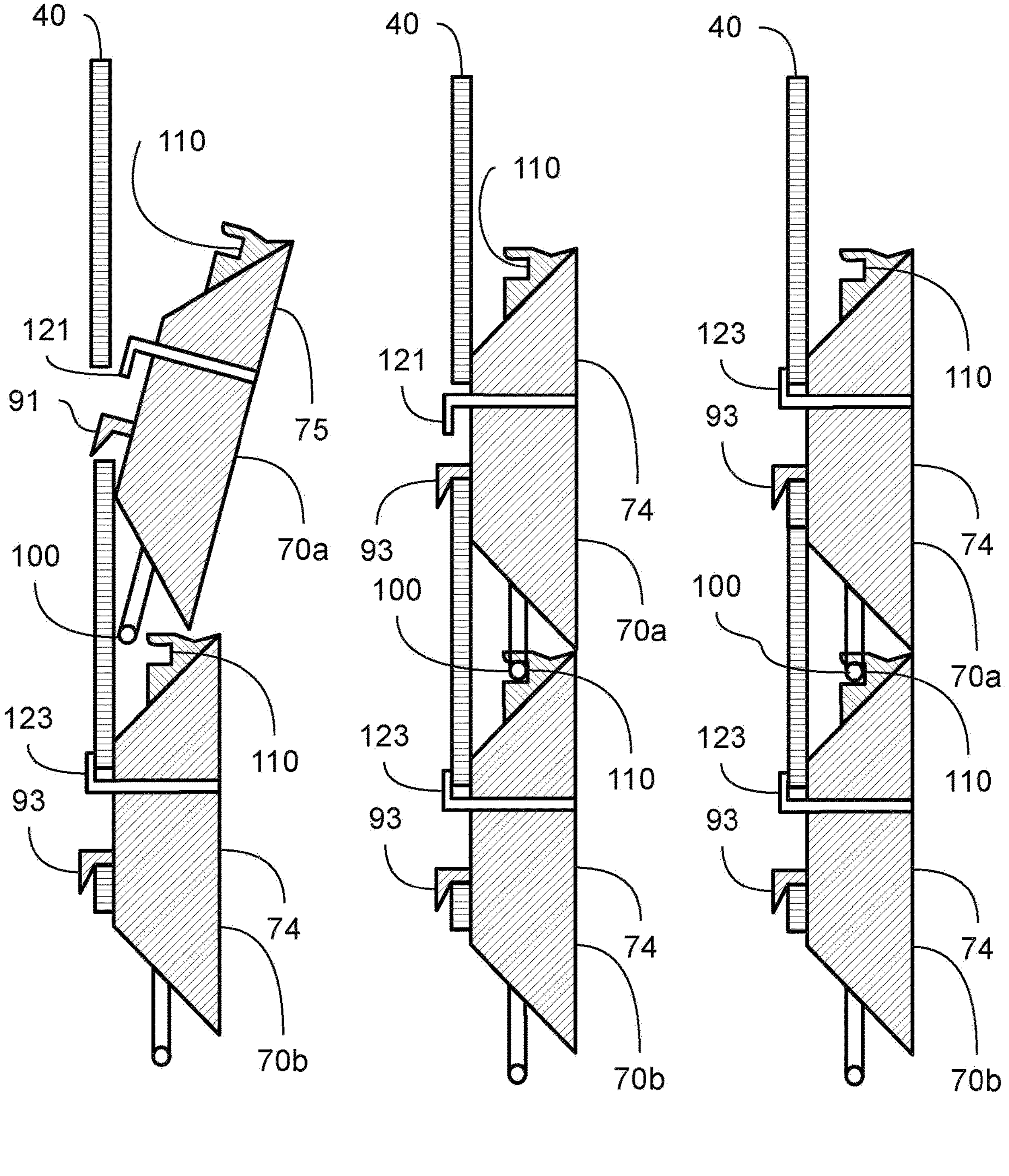
FIG. 3A-FIG. 3C shows a cross sectional schematic views pointing out features facilitating installation, removal, retention and non-retention of a display module to/from a support frame. Process steps for installation and removal from the front side of a display are shown.

Turning now to FIG. 3A, FIG. 3B, and FIG. 3C, shown are cross sectional schematic views pointing out various beneficial aspects of display module 70, and in particular, how a first display module may be engaged with a support frame 40 and how it may engage with an adjacent second display module 70*b*, wherein both actions may be completed by a person from the front, or display side, of the display module. FIG. 3A shows first display module 70*a* comprising: alignment feature 100 and complementary alignment feature 110, frame grip, rigidly coupled to the display module and disposed in a service position 91, and frame retention means in a non-retaining position 121. Second display module is shown with frame grip in an installed position 93 and frame retention means in a retaining position 123, and having a display plane 74, alignment feature 100, and complementary alignment feature 110. A display module may be characterized as being installed onto the support frame when its frame grip is disposed in an installed position and its frame retention means is disposed in a retaining position. A plurality of display modules that have been installed onto a support frame collectively create a viewing plane in which the plurality of display modules produce a uniform tiling of a portion of the viewing plane having no noticeable gaps or overlaps between adjacent display modules. Second display module 70*b* is shown in an installed position in FIG. 3A, FIG. 3B and FIG. 3C.

Continuing with FIG. 3A, the frame grip of first display module 70*a* may be caused to engage with support frame 40 when display plane 75 is disposed at a first angle with respect to adjacent display module that has already been installed onto the support frame. First display module 70*a* may then be moved so that first display module 70*a* is disposed according to FIG. 3B, in which the frame grip has transitioned from the service position of FIG. 3A to frame grip installed position 93. While first display module 70*a* transitions to frame grip installed position 93, alignment feature 100 of first display module is operatively engaged with complementary alignment feature 110 of second display module 70*b*. When an alignment feature and a complementary alignment feature are operatively engaged, the position and/or orientation of the display plane of first display module 70*a* may be constrained to the position and/or alignment of the display plane of second display module 70*b*. Operative engagement of alignment and complementary alignment features may constrain adjacent display planes of adjacent display modules in a variety of ways with respect to both position and orientation. The x-axis, y-axis, z-axis, and the angle of the display plane with respect to each of x-axis, y-axis, and z-axis, may individually or in combination be constrained by one or more pairs of alignment and complementary alignment features. In preferred embodiments, operative engagement of alignment feature of a display module with complementary alignment feature of adjacent display module operates to create a pixel gap between adjacent light emitting elements between adjacent display modules that is substantially equal to the pixel gap between light emitting elements within a single display module.

FIG. 3C shows the apparatus of FIG. 3B in which frame retention means of first display module 70*a* has been actuated into a frame retaining position 123. Preferred embodiments of frame retention means provide a durable and removeable clamping action to engage support frame 40. It can be seen that the steps shown in FIG. 3*a*, FIG. 3B, and FIG. 3C can performed in sequence to install a display module, and that the sequence can be performed in a reversed order to remove a display module. The frame retention means may be operated by a person from the display plane side of the display module, thereby facilitating both installation and removal from the front of the display module. Preferred embodiments of frame retention means provide a spring member creating a compliant clamping force, effective for retaining the display module despite environmental fluctuations of temperature and humidity. While frame retention means is in retaining position 123, alignment feature 100 and complementary alignment feature are urged to stay operatively engaged. The frame retention means on each display module may provide a secure but compliant attachment to the support frame 40, thereby allowing the pairs of complementary alignment features to determine the orientation and position of the plurality of display planes with respect to each other while, at the same time, the plurality of display modules are free enough with respect to support frame 40 to accommodate such environmental factors as curvature of the support frame, non-uniformity of the support frame, and mechanical and dimensional changes to the support frame caused by vibration, aging, and thermal effects.

Figure 4A:
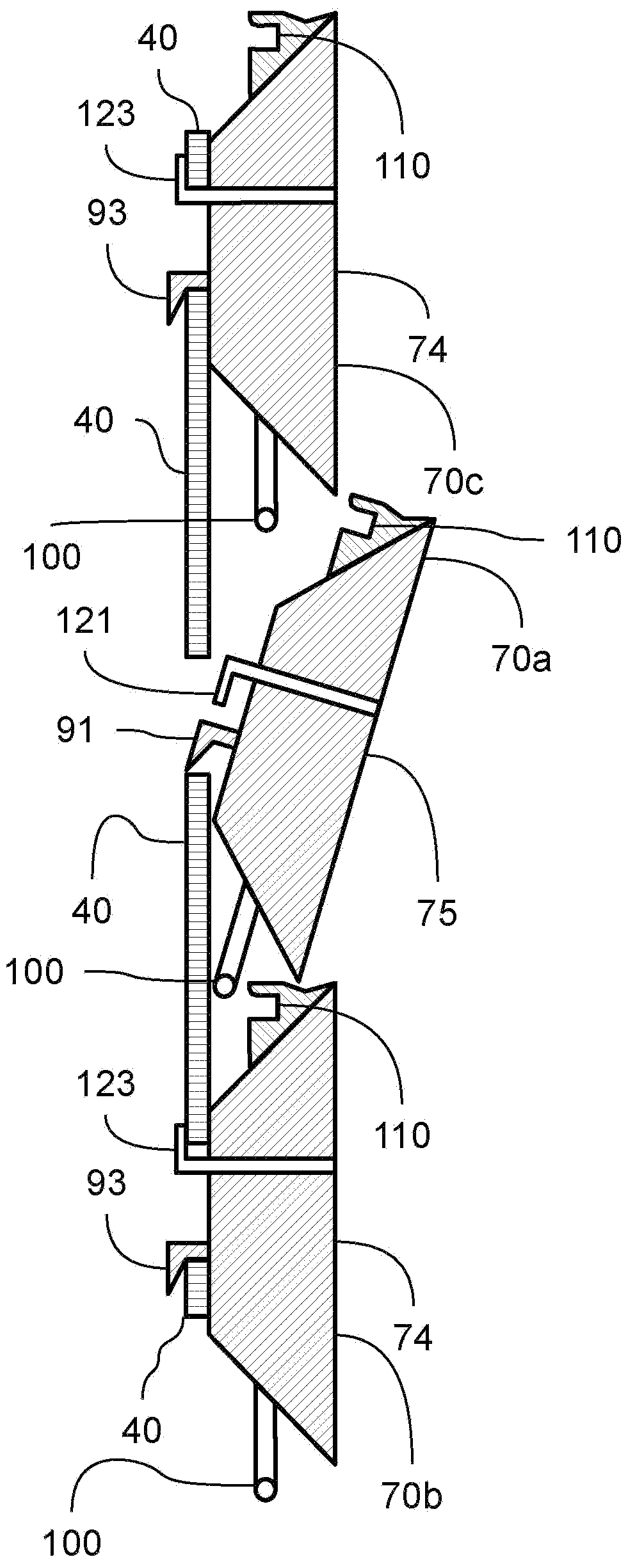
FIG. 4A and FIG. 4B show a cross sectional schematic view of an embodiment according to the present disclosure in which a display module may be become operatively engaged with the alignment features of more than one adjacent display module as the display module is installed on a support frame. Process steps for installation and removal from the front side of the display are shown.
Figure 4B:
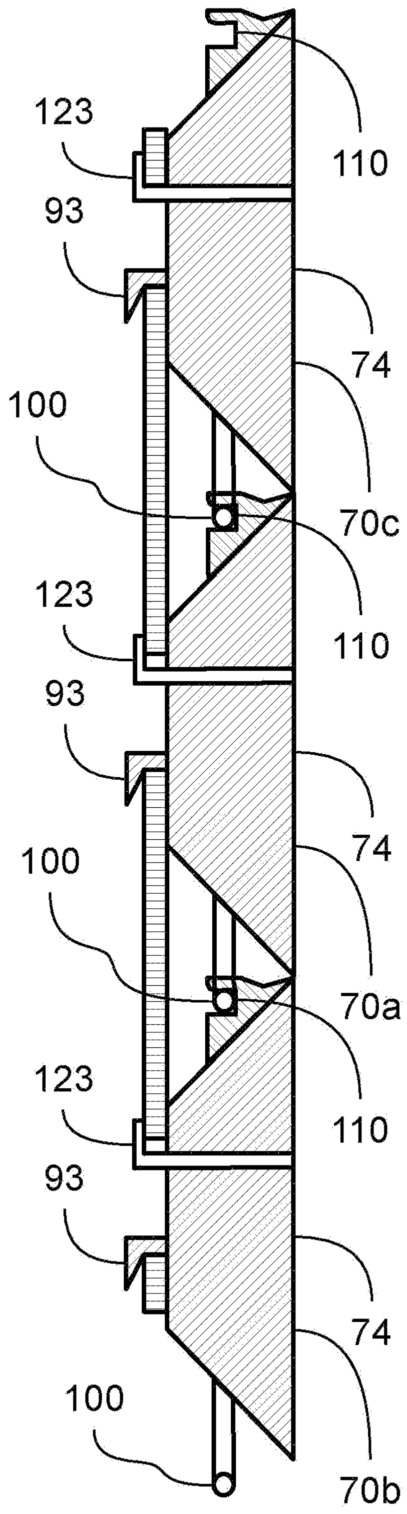

Shown in FIG. 4A, is a cross sectional schematic view is an embodiment according to the present disclosure in which a display module may be become operatively engaged with the alignment features of more than one adjacent display module as the display module is installed on support frame 40. A first display module 70*a*, a second display module 70*b* and a third display module 70*c* are shown, each comprising alignment feature 100, complementary alignment feature 110, a plurality of light emitting elements arranged in a predetermined pattern on a display plane, frame grip, and frame retention means. FIG. 4A shows the frame grip of first display module 70*a* in a service position 91 and frame retention means in a non-retaining position 121. In the position shown in FIG. 4A, the display plane 75 is shown having an angle with respect to the viewing plane defined collectively by the display planes of second display module 70*b* and third display module 70*c* while the frame grip of first display module 70*a* is engaged with the support frame and may support the weight of the display module against gravity, thereby making installation and removal easier. FIG. 4B shows the apparatus of FIG. 4A in which first display module 70*a* may be moved so that its frame grip is disposed in a frame grip installed position 93, and thereafter frame retention means may be operated into frame retention means retaining position 123.

While first display module 70*a* transitions to frame grip installed position 93, alignment feature 100 of first display module 70*a* is operatively engaged with complementary alignment feature 110 of second display module 70*b*, and, complementary alignment feature 110 of first display module 70*a* is operatively engaged with alignment feature 110 of third display module 70*c*. As described with reference to prior figures, when an alignment feature and a complementary alignment feature are operatively engaged, the position and/or orientation of the display plane of first display module 70*a* may be constrained to the position and/or alignment of both the display plane of second display module 70*b* and the display plane of third display module. FIG. 4B makes clear that complementary alignment features on multiple adjacent display modules may be operatively engaged when first display module 70*a* is tilted into its installed position. The apparatus shown in FIG. 4A and FIG. 4B can be installed into a previously installed plurality of display modules and can also be removed from a plurality of installed display modules. Installation and removal of any display module according to the present disclosure can be accomplished by actions performed solely in front of the display plane.

The frame retention means on each display module may provide a secure but compliant attachment to the support frame 40, thereby allowing the pairs of complementary alignment features to determine the orientation and position of the plurality of display planes with respect to each other while, at the same time, the plurality of display modules are free enough with respect to support frame 40 to accommodate such environmental factors as curvature of the support frame, non-uniformity of the support frame, and mechanical and dimensional changes to the support frame caused by vibration, aging, and thermal effects.

Figure 5:
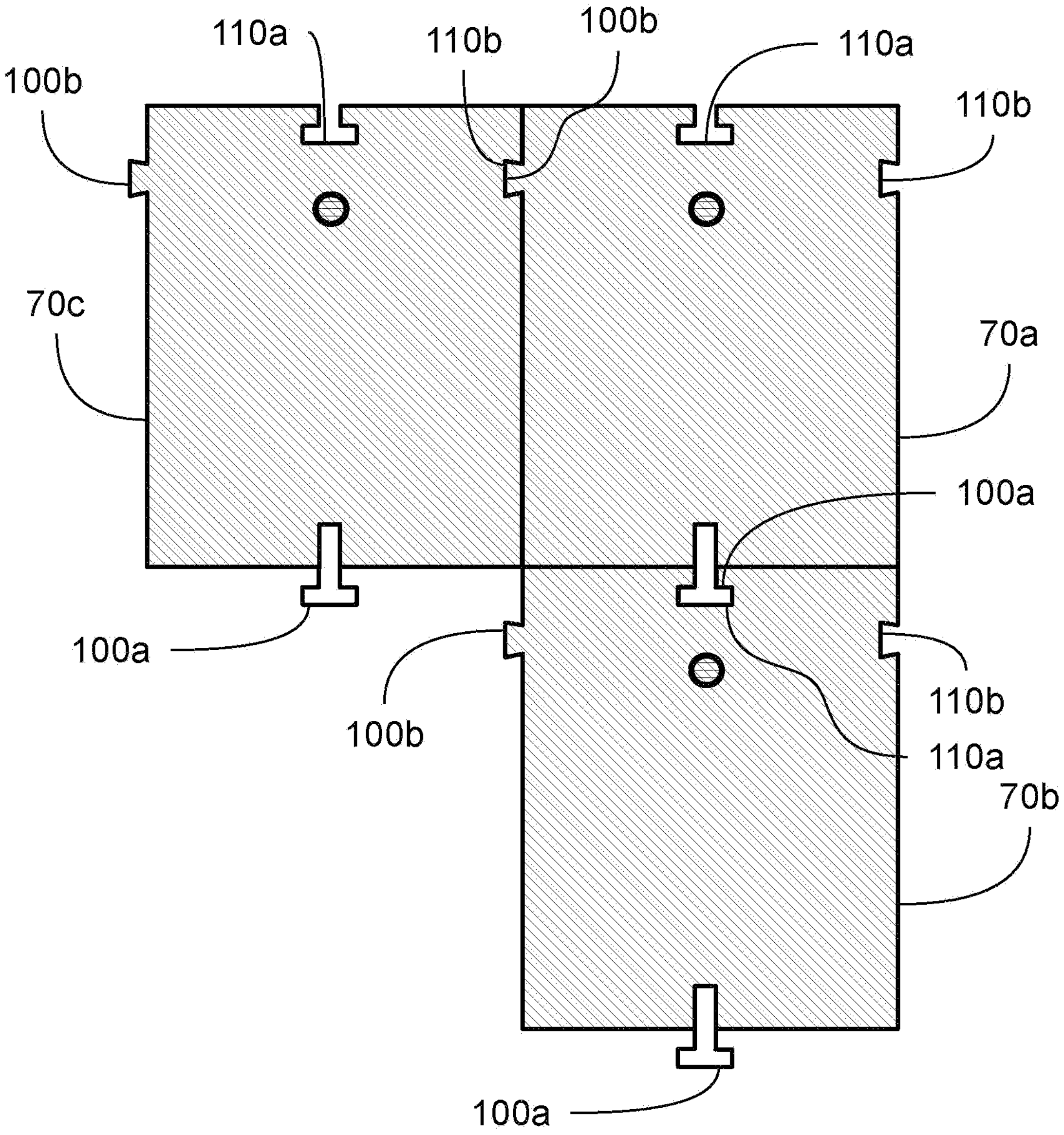
FIG. 5 shows a schematic cross sectional view of a plurality of display modules in which more than one pair of complementary alignment features are simultaneously operatively engaged.

Turning to FIG. 5, shown is a schematic cross sectional view of another embodiment according to the present disclosure in which each of first display module 70*a*, second display module 70*b*, and third display module 70*c* has a first and second alignment feature 100*a* and 100*b*, respectively, and each display module has a first and second complementary alignment feature 110*a* and 110*b*, respectively. According to FIG. 5, first alignment feature 100*a* can be operatively engaged with first complementary alignment feature 110*a* of an adjacent display module, while second alignment feature 100*b* can be operatively engaged with second complementary alignment feature 110*b*. When alignment features and a complementary alignment features are operatively engaged, the position and/or orientation of the display plane of first display module 70*a* may be constrained to the position and/or alignment of the display plane of one or more adjacent display modules. Different alignment and complementary alignment features may be simultaneously operatively engaged thereby urging the alignment of the display planes of every adjacent display module.

Figure 6A:
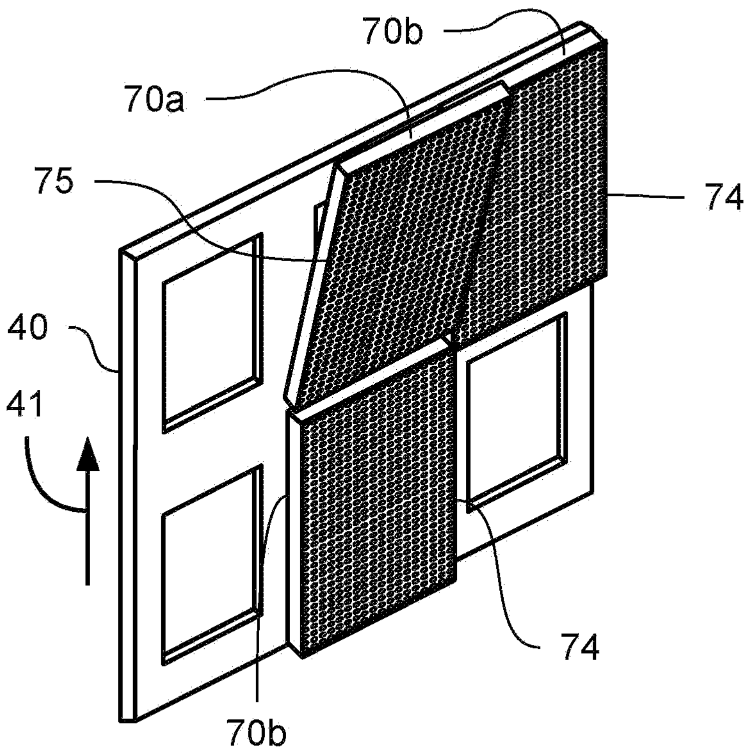
FIG. 6A shows a perspective view of a system of display modules installed on a support frame. One display module is shown in the midst of being either installed or removed.
Figure 6B:
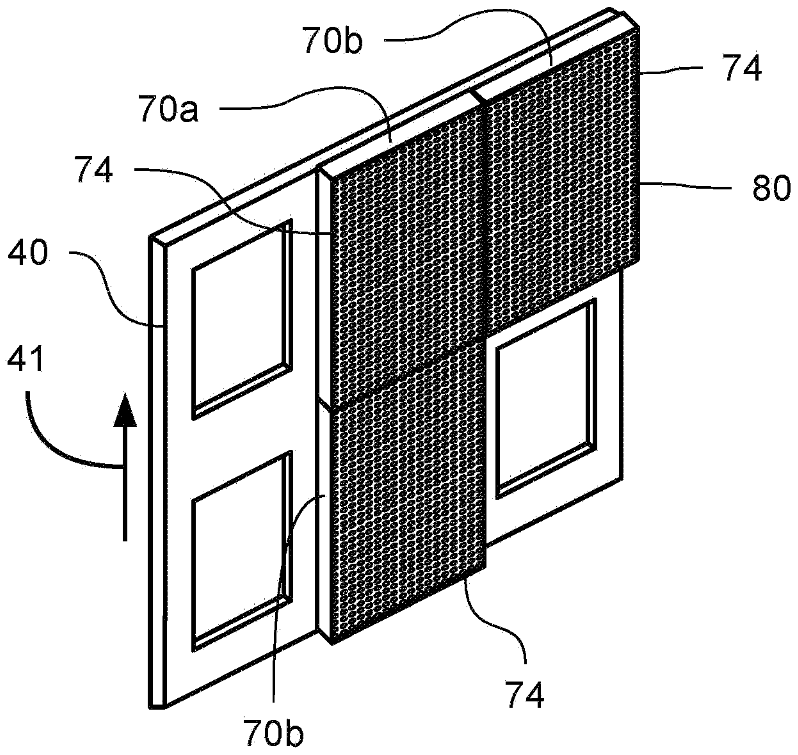
FIG. 6B shows a perspective view of a system of display modules installed on a support frame. Three installed modules are shown collectively creating a viewing plane.

FIG. 6A and FIG. 6B shows a perspective view of a system of display modules, installed on a support frame 40, consistent with the display modules described previously, however, the drawing is simplified for clarity. First display module 70*a* of FIG. 6A is shown with display plane 75 tilted at angle with respect to the collectively established viewing plane of the previously installed display modules, second display module 70*b* and third display module 10*c*. When first display module 70*a* is moved to an installed position, alignment and complementary alignment features are moved to become operatively engaged for establishing and maintaining alignment between the display planes of adjacent modules. FIG. 5 and FIG. 6A and FIG. 6B show, in combination, that multiple pairs of complementary alignment features may be made to operatively engage as the display plane of a display module is moved from being at an angle with respect to the viewing plane to an angle that is coincident with the viewing plane. The display planes of first, second, and third display modules, 70*a*, 70*b*, and 70*c*, respectively, are urged to remain aligned and substantially co-planar by means of the action of multiple alignment features.

Figure 7A:
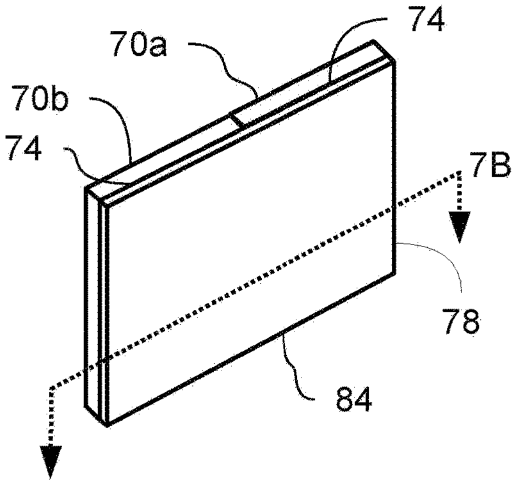
FIG. 7A shows another embodiment of a modular display system according to the present disclosure having more than one display module coupled to a semi-rigid front mask. Cross section 7B is indicated.

FIG. 7A presents a modular display system according to another embodiment of the present disclosure in which a display assembly 78 for use with an identical adjacent display assembly, comprises: a first display module 70*a* having a display plane 74; a second display module 70*b* having a display plane 74, identical to the first display module and disposed with respect to the first display module such that the display plane of second display module 70*b* abuts the display plane of first display module 70*a*; and a semi-rigid front mask 84 coupled to both first display module 70*a* and second display module 70*b*, front mask 84 being substantially co-planar with and covering the display planes of both said first display module and said second display module. In preferred embodiments, front mask 84 may be a thin material having a plurality of perforations, further characterized in that each light emitting element may be visible through a corresponding perforation and front mask 84 comprises a material that is substantially opaque to visible light, thereby greatly reducing the optical interference of any light emitting element with its neighbors. In other embodiments, front mask 84 may be a solid material, at least partially transparent to the light emitted by each light emitting element. Other configurations of front mask are possible in which light emitting elements project light through the front mask and produce an image upon the viewing plane.

Figure 7B:
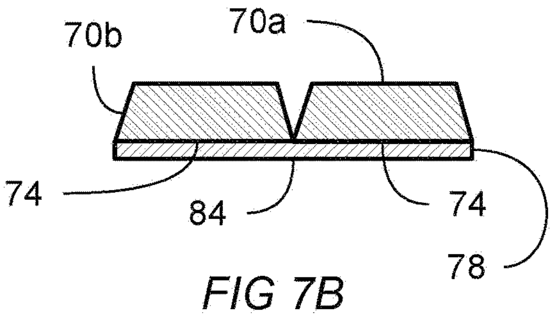
FIG. 7B shows a cross section of the display assembly of FIG. 7A in a flat state.
Figure 7C:
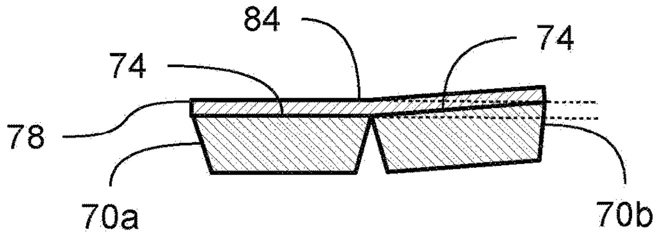
FIG. 7C shows the display assembly of FIG. 7B in a flexed state.

FIG. 7B shows a cross sectional view of the apparatus of FIG. 7A. FIG. 7C shows a cross sectional view of apparatus of FIG. 7A and FIG. 7B in which the semi-rigid front mask has been flexed out of the flat plane to a non-flat shape. The doted lines of FIG. 7C indicate a previously flat front mask that has been bent or curved or flexed into a non-flat shape. By means of the semi-rigid front mask 84, which permits flexing of the front mask in the region proximate to the abutment of the display planes 74 of first display module 70*a* and second display module 70*b*, a plurality of display assemblies may be assembled to create a large display that curves or bends or flexes responsive to the undulations that may be present in the support frame 40 on which the display is mounted.

Figure 7D:
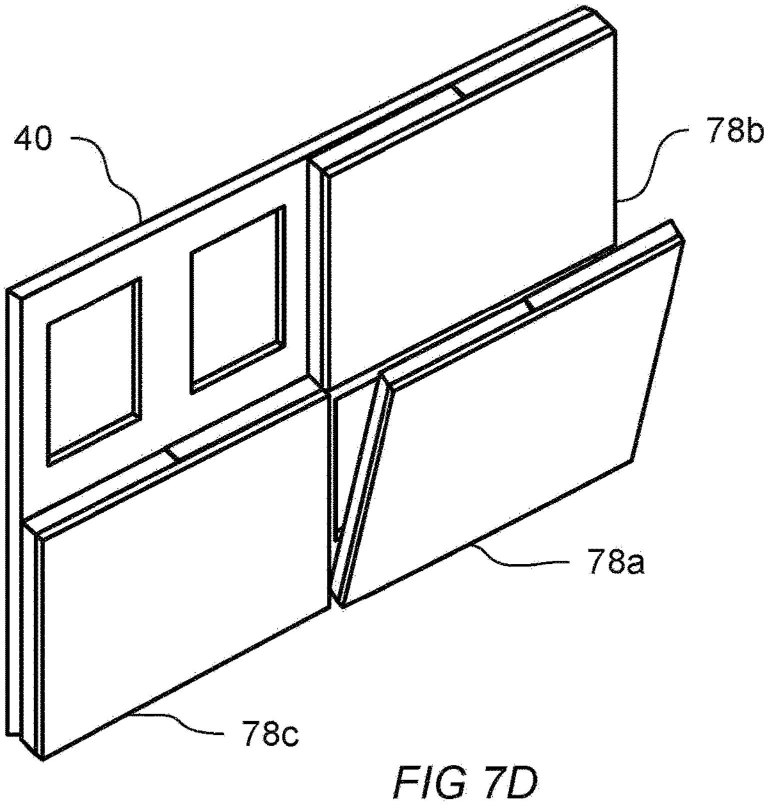
FIG. 7D shows a perspective view of a modular display system comprising a plurality of display assemblies attached to a support frame.

Display modules used in the embodiments of FIG. 7A-FIG. 7D may include any or all of the features previously described. As such, display assembly 78 may include one or more frame grips, one or more frame retention means, one or more alignment features, and one or more complementary alignment features. FIG. 7D shows a perspective view of a modular display system comprising a plurality of display assemblies, 78*a*, 78*b*, and 78*c*, attached to support frame 40.

Figure 8A:
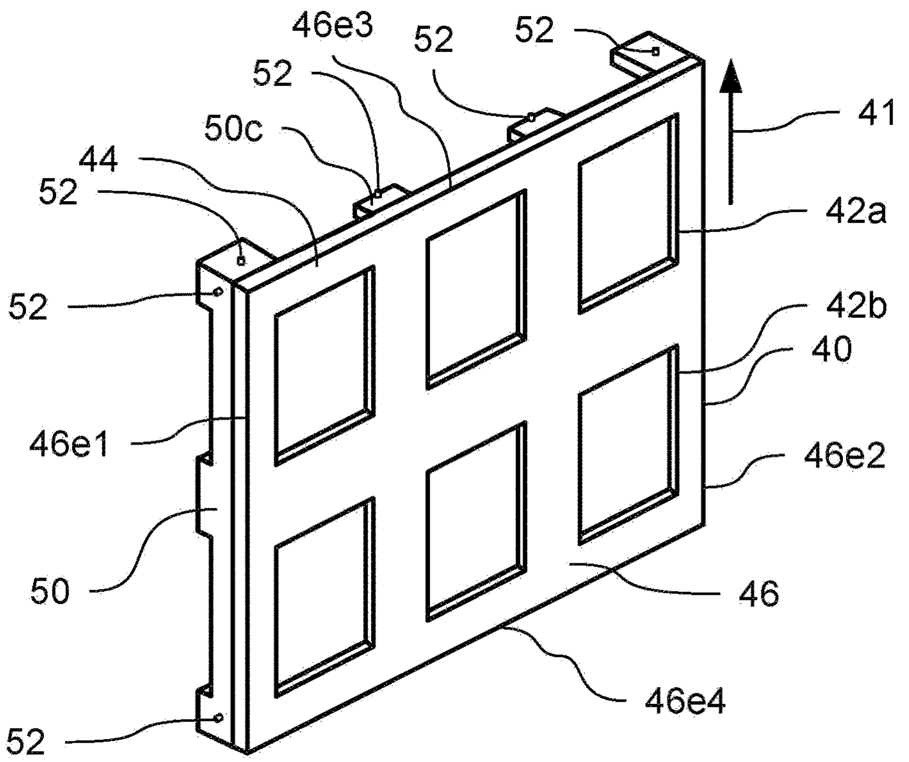
FIG. 8A shows a perspective view of the front of a support frame according to an embodiment of the present disclosure.
Figure 8B:
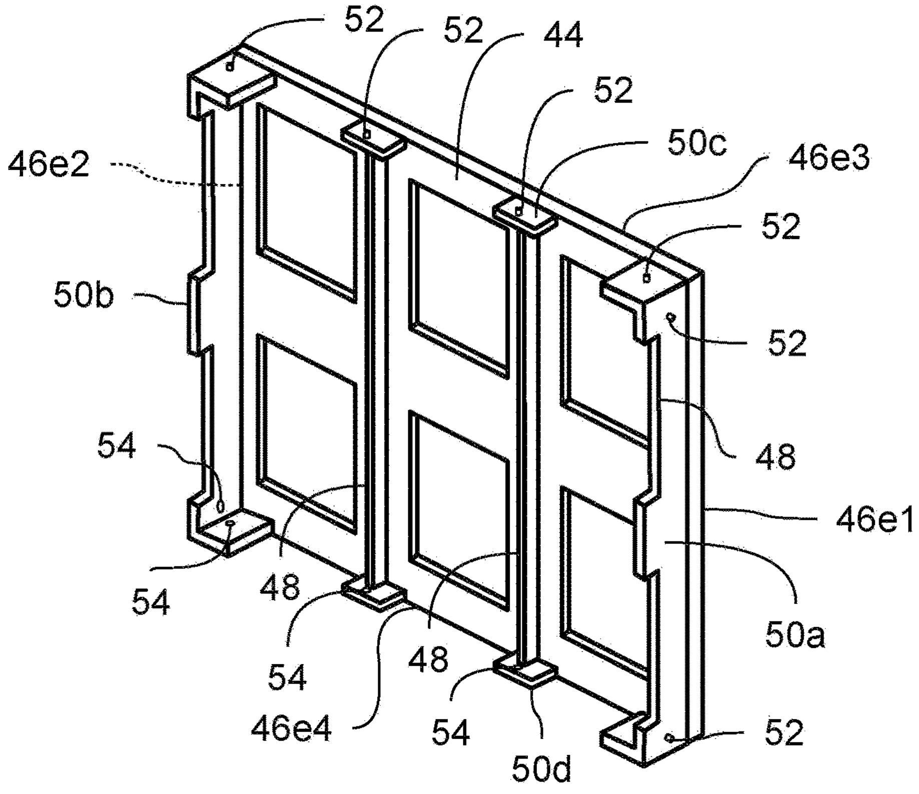
FIG. 8B shows a perspective view of the back of the support frame of FIG. 8A.
Figure 9:
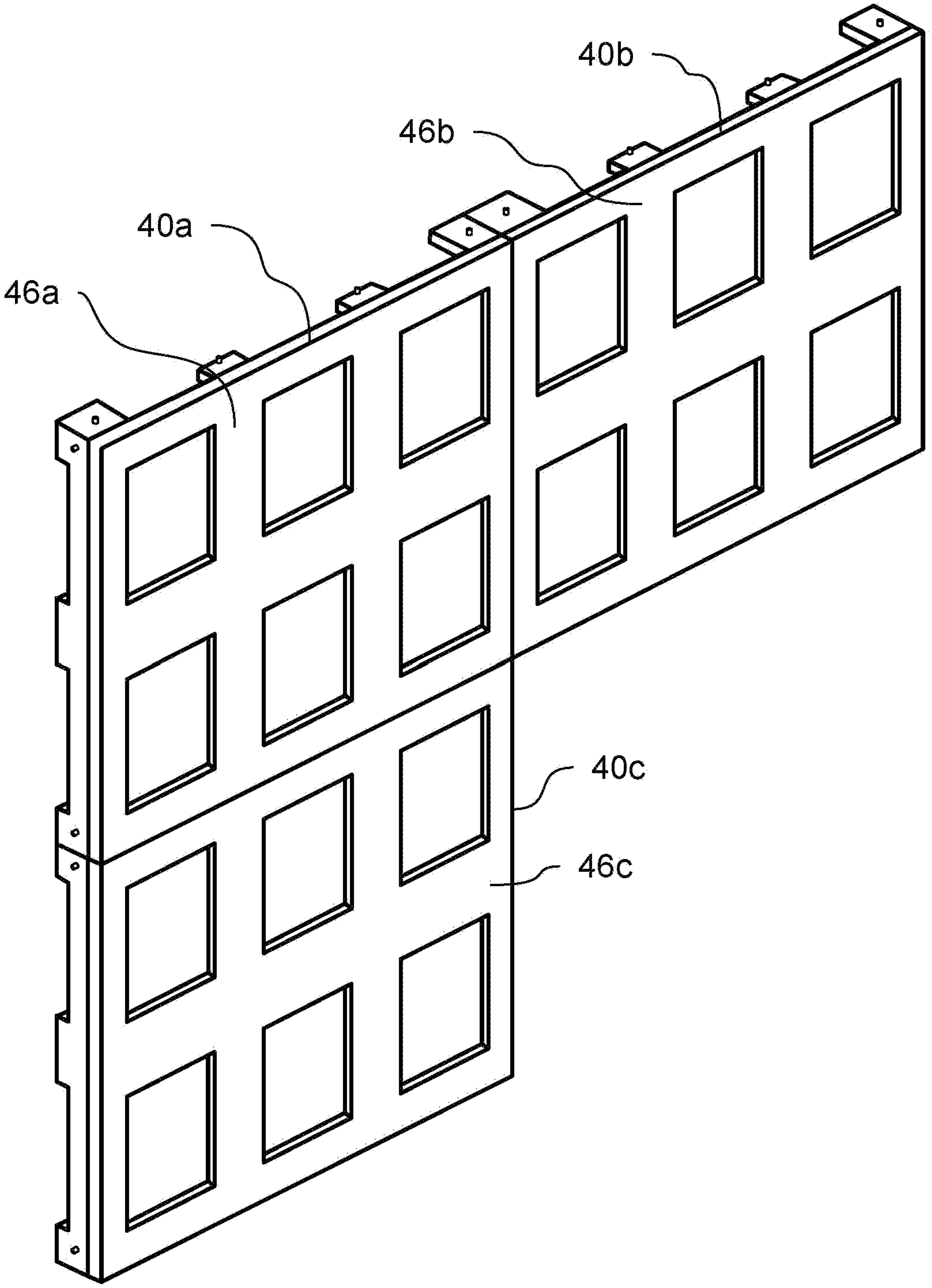
FIG. 9 shows a perspective view of three support frames assembled together according to the features described for FIG. 8A and FIG. 8B.

Turning now to FIG. 8A, FIG. 8B, and FIG. 9, shown are additional features of the present disclosure that address the needs of mounting, assembling, and servicing of large visual displays that are created by tiling one or more display modules onto an underlying modular support frame structure. FIG. 8A shows a perspective view of the front of a support frame 40 according to an embodiment of the present disclosure. Support frame 40 is shown comprising: thin planar support body 44 having one or more support frame apertures 42*a* and 42*b*, and having a display mounting face 46 that is suitable for mounting display modules of the present disclosure. Display mounting face 46 is shown disposed within the perimeter defined by first edge 46*e*1, second edge 46*e*2, third edge 46*e*3, and fourth edge 46*e*4. Support frame 40 is configured to support the weight of tiled display modules along the direction defined by support direction 41 and is furthermore able to curve in directions transverse to the support direction. FIG. 8B shows a plurality of support ribs 48, each coupled to planar support body 44, opposite to display mounting face 46, and configured to be substantially aligned with support direction 41.

FIG. 8A and FIG. 8B jointly show features of the support frame that facilitate the assembly and alignment of adjacent support frames. A first mating face 50*a* is shown disposed contiguous to at least a portion of first edge 46*e*1 of said display mounting face 46, first mating face 50*a* being substantially perpendicular to display mounting face 46 where the first mating face and the display mounting face meet. First mating face 50*a* has one or more alignment features 52 disposed in a predetermined relationship to display mounting face 46. Support frame 40 also has a second mating face 50*b* shown disposed contiguous to at least a portion of second edge 46*e*2 of display mounting face 46, second mating face 50*b* being substantially perpendicular to display mounting face 46 where second mating face 50*b* and display mounting face meet. Second mating face 50*b* has one or more complementary alignment features 54 disposed in a predetermined relationship to said one or more alignment features 52. Alignment features 52 and complementary alignment features 54 are designed so that operative engagement of an alignment feature on a frame support with a complementary alignment feature of an adjacent frame support operate together to make the display mounting face of the frame support substantially co-planar with the display mounting face of the adjacent frame support in the region where the mating faces of the two support frames meet.

In preferred embodiments, a mating face may be a surface portion of a support rib located at an edge of the display mounting face. In other preferred embodiments, alignment/complementary alignment features may be a pin/hole configuration, a tab/slot configuration, or a ball/socket configuration. After adjacent support frames are operatively engaged by means of one or more pairs of alignment/complementary alignment features, the adjacent support frames may be durably coupled together by means including: screws, clips, clamps, nuts and bolts, adhesives, etc. In other embodiments the alignment/complementary alignment features may be designed such that they provide both alignment and positive, durable coupling between adjacent support frames.

With continuing reference to FIG. 8A, FIG. 8B, and FIG. 9, additional mating faces may be attached to support frame 40. Third edge 46*e*3 and fourth edge 46*e*4 may be defined extending transverse to the support direction 41. A third mating face 50*c* may be disposed along a portion of third edge 46*e*3 and having a alignment feature 52. A fourth mating face 50*d* may be disposed along a portion of fourth edge 46*e*4 and having a complementary alignment feature 54. Alignment feature 52 of third mating face 50*c* is designed to operatively engage the complementary alignment feature on the fourth mating face of an adjacent support frame, and thereby urge the display mounting faces of the adjacent support frames to be substantially coplanar in the region where the mating faces meet.

In preferred embodiments, third mating face 50*c* and fourth mating face 50*d* are disposed at opposite ends of a support rib, and are each coupled to a small portion of their respective display mounting face edges. When alignment/complementary alignment features are operatively engaged, co-planarity of display mounting faces of adjacent support frames may be ensured.

The system of three support frames in FIG. 9 show the assembly of first support frame 40*a*, second support frame 40*b*, and third support frame 40*c*, in which the mating faces of adjacent support frames are aligned according to the operative engagement of alignment features with their respective complementary alignment features, thereby achieving substantial co-planarity between the adjacent edges of first display mounting face 46*a* and second display mounting face 46*b*, and between adjacent edges of first display mounting face 46*a* and third display mounting face 46*c*. A plurality of support frames may thus be assembled to provide a large support frame system with desirable properties.

The disclosed support frames and display modules may be used in a number of installation environments. One typical installation environment for a large display system is a rigid architectural structure like a wall that provides a mounting surface onto which the system of support frames may be mounted. Accordingly, in some embodiments of the present disclosure, a system of modular support frames may be assembled thereby providing a substructure for attaching display modules so as to provide a substantially flat viewing plane.

In addition to installation environments that result in a substantially flat viewing plane, other installation environments may require adapting the curvature of the viewing plane to convex, concave, and/or multiple curvature containing shapes that may each have their own appeal and challenges. Accordingly, embodiments of the present disclosure describe a system of modular support frames that may be assembled to provide a substructure for attaching display modules that presents a non-flat viewing plane having convex, concave, or multiple convex and concave curvatures. One or more display modules may be individually installed, serviced, and removed from the system of support frames without substantially disturbing adjacent display modules.

Figure 10A:
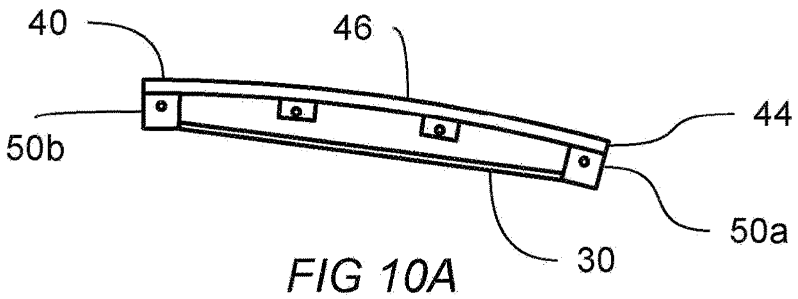
FIG. 10A shows a top down view of a support frame according to another embodiment of the disclosure in which a tension member coupled to the support frame creates a convex display mounting face.

Turning now to FIG. 10A-FIG. 10D, shown are top down views of various embodiments providing curvature to one or more display mounting faces. FIG. 10A shows a top down view of a support frame 40 according to another embodiment of the disclosure in which a tension member 30 coupled to planar support body 44 creates a convex display mounting face 46. First mating face 50*a* and second mating face 50*b* are shown at opposite edges of display mounting face 46. When planar support body 44 is not subject to tension member 30, display mounting face 46 may take on a flat configuration. In preferred embodiments, tension forces are coupled to the support frame at the location of two different support ribs, thereby causing the display mounting face to gracefully curve in a direction transverse to the support ribs.

Figure 10B:
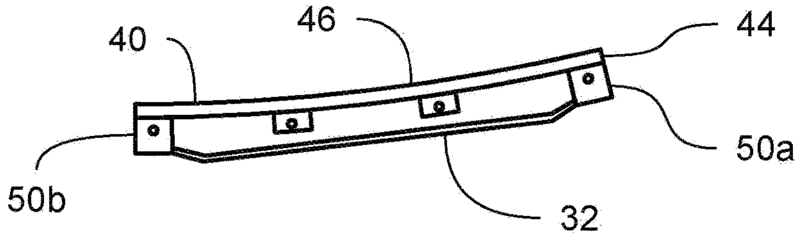
FIG. 10B shows a top down view of a support frame according to another embodiment of the disclosure in which a tension member coupled to the support frame creates a concave display mounting face.

FIG. 10B shows a top down view of a support frame 40 according to another embodiment of the disclosure in which a compression member 32 coupled to planar support body 44 creates a concave display mounting face 46. First mating face 50*a* and second mating face 50*b* are shown at opposite edges of display mounting face 46. When planar support body 44 is not subject to compression member 32, display mounting face 46 may take on a flat configuration. In preferred embodiments, compression forces are coupled to the support frame at the location of two different support ribs, thereby causing the display mounting face to gracefully curve in a direction transverse to the support ribs.

Figure 10C:
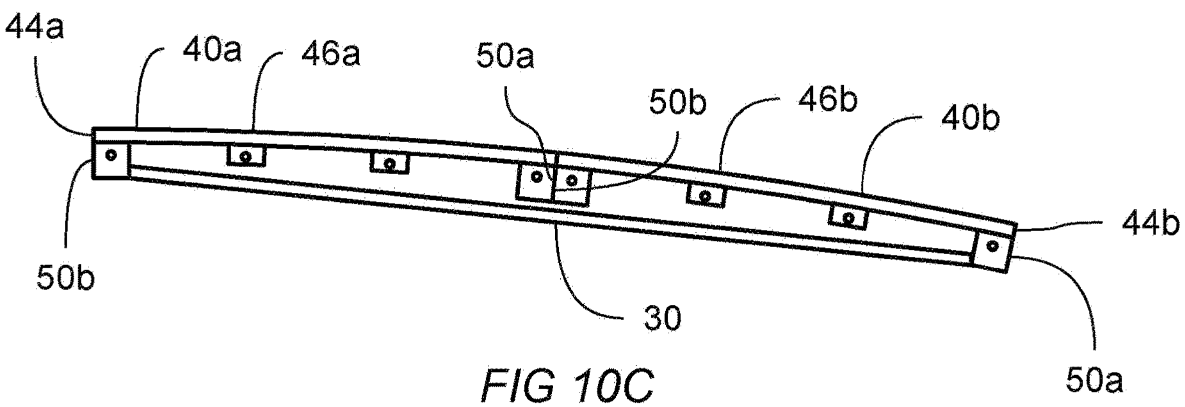
FIG. 10C shows a top down view of more than one support frame joined together along their mating faces in which a tension member coupled to the support frames creates a convex display mounting face spanning more than one support frame.

FIG. 10C shows a top down view of a plurality of support frames joined together along their mating faces in which a tension member coupled to different support frames creates a convex display mounting face spanning more than one support frame. The figure shows first mating face 50*a* of first support frame 40*a* and second mating face 50*b* of second support frame 40*b* joined in a manner consistent with foregoing descriptions in which alignment features and complementary alignment features on the two support frames are operatively engaged thereby providing substantial co-planarity between the adjacent edges of first display mounting face 46*a* and second display mounting face 46*b*. Tension member 30 is coupled to first planar support body 44*a* and second planar support body 44*b* thereby creating a convexly curving compound display mounting face spanning both first display mounting face 46*a* and second display mounting face 46*b*. In preferred embodiments, tension forces are coupled to the support frame at the location of two different support ribs, thereby causing the display mounting face to gracefully curve in a direction transverse to the support ribs.

Figure 10D:
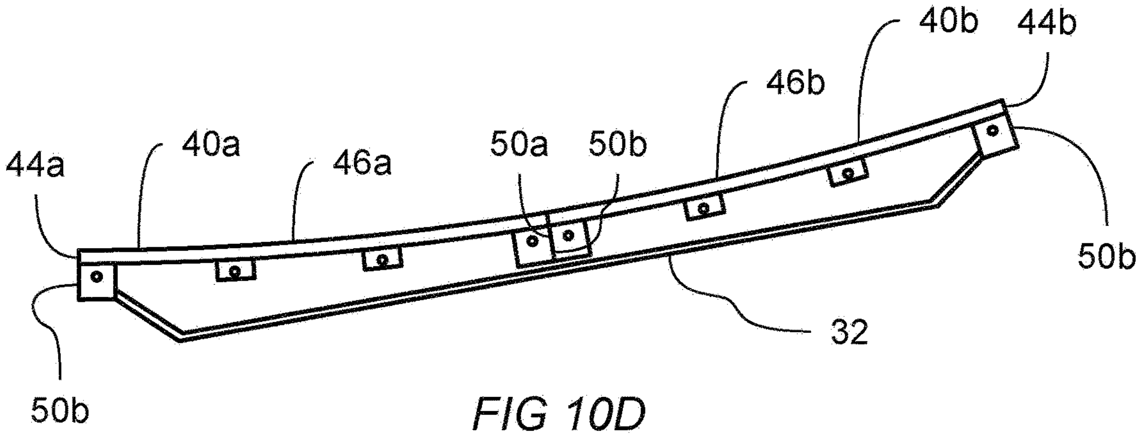
FIG. 10D shows a top down view of more than one support frame joined together along their mating faces in which a tension member coupled to the support frames creates a concave display mounting face spanning more than one support frame.

FIG. 10D shows a top down view of a plurality of support frames joined together along their mating faces in which a compression member coupled to different support frames creates a concave display mounting face spanning more than one support frame. The figure shows first mating face 50*a* of first support frame 40*a* and second mating face 50*b* of second support frame 40*b* joined in a manner consistent with foregoing descriptions in which alignment features and complementary alignment features on the two support frames are operatively engaged thereby providing substantial co-planarity between the adjacent edges of first display mounting face 46*a* and second display mounting face 46*b*.

Compression member 32 is coupled to first planar support body 44*a* and second planar support body 44*b* thereby creating a concavely curving compound display mounting face spanning both first display mounting face 46*a* and second display mounting face 46*b*. In preferred embodiments, compression forces are coupled to the support frame at the location of two different support ribs, thereby causing the display mounting face to gracefully curve in a direction transverse to the support ribs.

In addition to environments in which a curved, but fixed shape of viewing plane is desired, other environments may call for adjustable curvatures. Accordingly, other embodiments of the present disclosure provide adjustable tension members and adjustable compression members which may be adjusted to change the curvature of the viewing plane. Furthermore, an adjustable member that operates in compression over a portion of its adjustable range and operates in tension over a different portion of its adjustable range may provide viewing plane curvature ranging from convex to concave.

Figure 11:
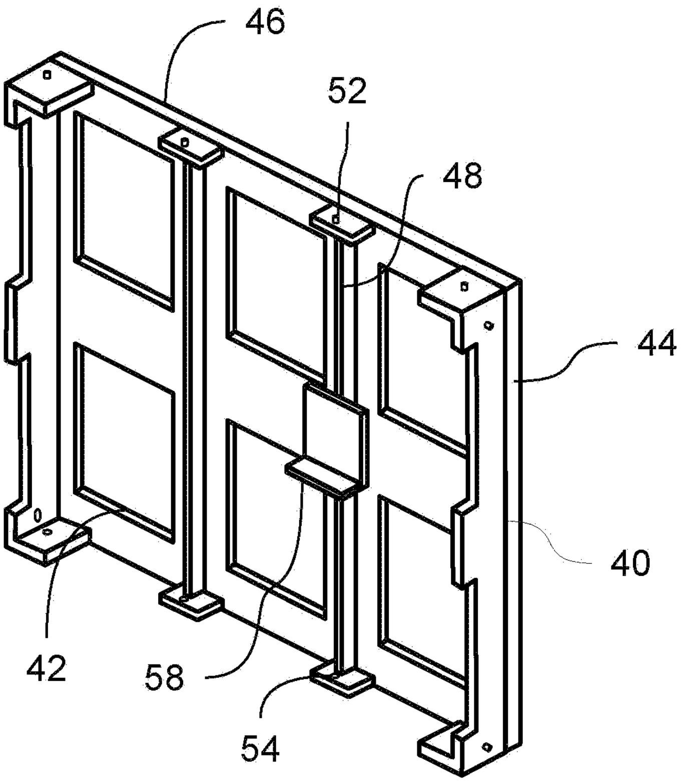
FIG. 11 shows a perspective view of the back of a support frame according to an embodiment of the present disclosure in which an equipment mount is attached to a support rib.

FIG. 11 shows a perspective view of the back of a support frame 40 according to an embodiment of the present disclosure in which an equipment mount 58 is attached to a support rib 48. In order to deploy a large modular display system, a variety of support equipment may be needed beyond the display modules and support frames already described. In particular, a plurality of power supplies and a plurality of display control units may be used to power display modules and to supply image data to the plurality of display modules comprising the viewing plane. It may be convenient to co-locate with a support frame a power supply that can satisfy the power requirements of all of the display modules installed onto that support frame.

Likewise, it may be convenient to co-locate with a support frame one or more display control units that can satisfy the data driving requirements of all of the display modules installed onto that support frame. This modular approach can be achieved by means of one or more equipment mounts, each attached to a support rib of a support frame. Attaching equipment mount 58 directly to support rib 48 allows the weight of any mounted equipment to be transmitted into the support structure along the direction of the support rib thereby preventing the attached weight from substantially affecting the ability of support frame 40 to curve smoothly in directions transverse to the support rib. More than one mount may be used to mount the desired amount of equipment.

Figure 12:
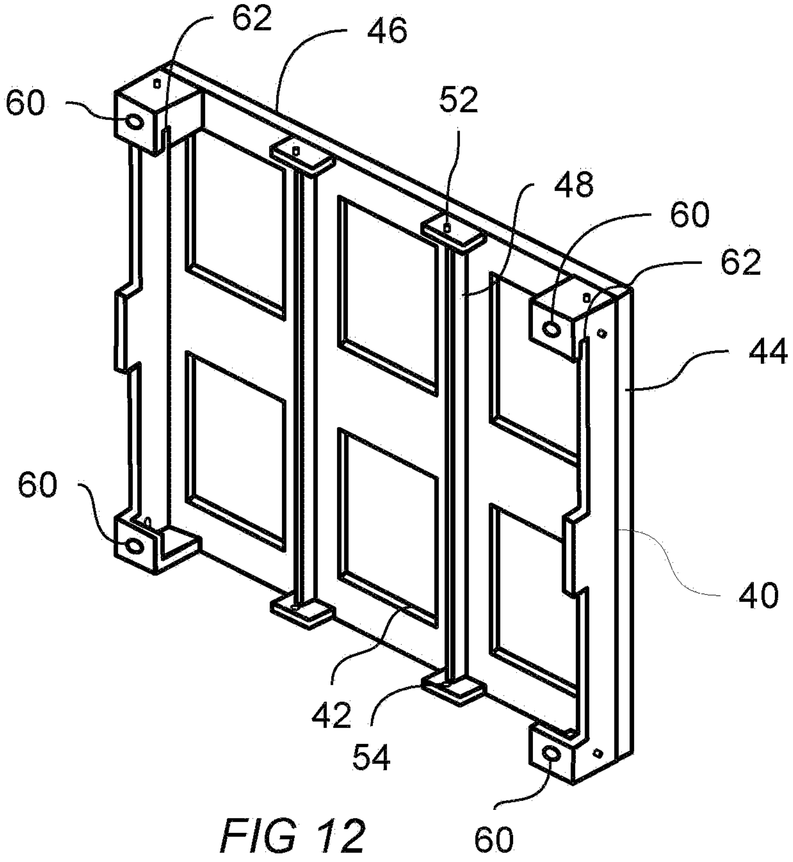
FIG. 12 shows a perspective view of the back of a support frame according to an embodiment of the present disclosure in which a plurality of frame mounting features and vertical frame mounting features are shown.

Turning now to FIG. 12, shown is a perspective view of the back of a support frame 40 according to an embodiment of the present disclosure in which a plurality of frame mounting features 60 are coupled to the back side of planar support body 44, opposite display mounting face 46. Support frame 40 may be attached to an underlying structure by means of one or more frame mounting features 60. In preferred embodiments, each frame mounting feature will be closely coupled to one or more support ribs 48, effectively transmitting the weight of the display through the support ribs into the underlying structure with out substantially affecting the ability of the support frame to curve gracefully in directions transverse to the support ribs. Furthermore, different configurations of frame mounting features may be appropriate for different mounting environments. FIG. 12 shows two vertical frame mounting features 62 that are effective for hanging or otherwise suspending support frame 40 from the top of the support frame. In some embodiments more than one type of frame mounting feature may be used. In preferred embodiments, the constituent material and thickness of planar support body 44 are chosen such that curvatures and loads required may be carried whilst the planar support body operates well within its elastic deformation regime and well away from its yield point. In the elastic deformation regime, the support frame will curve smoothly in response to loads applied at the locations of frame mounting features and will not bend or otherwise plastically deform.

By means of the previously described systems and methods, a fully modular system can be deployed in which each support frame carries its own power supply and display control units. Features of the disclosure describe embodiments that are suitable for a variety of environments including: hanging, structural wall mounting, and even free standing. A complete support frame system may then be constructed from a plurality of support frames by coupling adjacent support frames together in a desired configuration. Operatively engaged alignment and complementary alignment features of adjacent support frames ensure that the plurality of support frames collectively provides a display mounting face upon which display modules may be mounted. Display modules may then be tiled onto the support frame system, according to previously described methods, making use of one or more support frame apertures 42 for convenient power cable routing and data cable routing. Operatively engaged alignment and complementary alignment features of adjacent display modules ensure that the plurality of tiled display modules collectively provide a viewing plane without visual aberrations.

Although the present invention has been described in considerable detail with reference to certain preferred versions thereof, other versions are possible. It may be desirable to combine features shown in various embodiments into a single embodiment. A different number and configuration of features may be used to construct embodiments of the apparatus and systems that are entirely within the spirit and scope of the present disclosure. Therefor, the spirit and scope of the appended claims should not be limited to the description of the preferred versions contained herein.

Any element in a claim that does not explicitly state "means for" performing a specified function, or "step for" performing a specific function, is not to be interpreted as a "means" or "step" clause as specified in 35 U.S.C. Section 112. In particular, the use of "step of in the claims herein is not intended to invoke the provisions of 35 U.S.C. Section 112.

The invention claimed is:

1. A method of creating a curved light emitting visual display upon a curved viewing plane, the method comprising the steps of:

a) coupling a display module to a display mounting surface on a support frame, the display module comprising a plurality of light emitting elements coupled to a substrate, and the plurality of light emitting elements being disposed on a display plane in a predetermined pattern, and the plurality of light emitting elements collectively creating a visual display on the display plane;

b) coupling a tension member to the support frame at two different locations, the tension member adapted to apply a tension force between the two different locations to affect a curvature of the display plane; and c) coupling a releasable frame retention mechanism to the substrate, the releasable frame retention mechanism operable from the display plane side of the display module for actuation between a retaining position and a non-retaining position.

2. The method of claim 1 further comprising the retaining position of the releasable frame retention mechanism effective for coupling the display module to the support frame, the non-retaining position of the releasable frame retention mechanism allowing the display plane to tilt with respect to the curved viewing plane.

3. The method of claim 1 further comprising the releasable frame retention mechanism operable from the support frame side of the display module for actuation between the retaining position and the non-retaining position.

4. The method of claim 1 further comprising the applied tension force between the two different locations affecting a convex curvature of the display plane.

5. The method of claim 1 further comprising the applied tension force between the two different locations affecting a concave curvature of the display plane.

6. The method of claim 1 further characterized in that the display module is a first display module having a first display plane, the method further comprising the steps of:

a) coupling a second display module to the display mounting surface on the support frame, the second display module comprising a second plurality of light emitting elements coupled to a second substrate; and the second plurality of light emitting elements being disposed on a second display plane in a predetermined pattern, the second plurality of light emitting elements collectively creating a visual display on the second display plane, and b) disposing the second display module adjacent to the first display module, configuring the first and second display planes so that the predetermined pattern of the first display module is substantially aligned with the predetermined pattern of the second display module thereby creating no perceivable visual aberration between the predetermined pattern of the first display module and the predetermined pattern of the second display module.

7. The method of claim 6 further comprising the steps of:

a) coupling an alignment feature to the substrate of the first display module and the alignment feature being disposed in a predetermined relationship to the first display plane, b) coupling a complementary alignment feature to the second substrate of the second display module and the complementary alignment feature being disposed in a predetermined relationship to the second display plane, and c) engaging the alignment feature with the complementary alignment feature, to align the predetermined pattern of the first display plane with the predetermined pattern of the second display plane.

8. A method of creating a curved light emitting visual display upon a curved viewing plane, the method comprising the steps of:

a) coupling a display module to a display mounting surface on a support frame, the display module comprising a plurality of light emitting elements coupled to a substrate; and the plurality of light emitting elements being disposed on a display plane in a predetermined pattern, the plurality of light emitting elements collectively creating a visual display on the display plane, b) coupling a tension member to the support frame and the display plane, the tension member adapted to apply a tension force to the display plane to affect a curvature of the display plane; and c) coupling a releasable frame retention mechanism to the substrate, the releasable frame retention mechanism operable from the display plane side of the display module for actuation between a retaining position and a non-retaining position.

9. The method of claim 8 further comprising the retaining position of the releasable frame retention mechanism effective for coupling the display module to the support frame, the non-retaining position of the releasable frame retention mechanism allowing the display plane to tilt with respect to the curved viewing plane.

10. The method of claim 8 further comprising the releasable frame retention mechanism operable from the support frame side of the display module for actuation between the retaining position and the non-retaining position.

11. The method of claim 8 further comprising the applied tension force affecting a convex curvature of the display plane.

12. The method of claim 8 further comprising the applied tension force affecting a concave curvature of the display plane.

13. The method of claim 8 further characterized in that the display module is a first display module having a first display plane, the method further comprising the steps of:

a) coupling a second display module to the display mounting surface on the support frame, the second display module comprising a second plurality of light emitting elements coupled to a second substrate; and the second plurality of light emitting elements being disposed on a second display plane in a predetermined pattern, the second plurality of light emitting elements collectively creating a visual display on the second display plane, and b) disposing the second display module adjacent to the first display module, configuring the first and second display planes so that the predetermined pattern of the first display module is substantially aligned with the predetermined pattern of the second display module thereby creating no perceivable visual aberration between the predetermined pattern of the first display module and the predetermined pattern of the second display module.

* * * * *